(12) United States Patent
Ono et al.

(10) Patent No.: US 9,992,451 B2
(45) Date of Patent: Jun. 5, 2018

(54) INFORMATION PROCESSING DEVICE, CONTROL METHOD, AND SYSTEM

(71) Applicant: SONY CORPORATION, Tokyo (JP)

(72) Inventors: Hideyuki Ono, Kanagawa (JP); Masatomo Kurata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/117,492

(22) PCT Filed: Dec. 1, 2014

(86) PCT No.: PCT/JP2014/081776
§ 371 (c)(1),
(2) Date: Aug. 9, 2016

(87) PCT Pub. No.: WO2015/125375
PCT Pub. Date: Aug. 27, 2015

(65) Prior Publication Data
US 2016/0353062 A1 Dec. 1, 2016

(30) Foreign Application Priority Data
Feb. 18, 2014 (JP) ................... 2014-028426

(51) Int. Cl.
| | |
|---|---|
| *H04N 7/15* | (2006.01) |
| *H04N 7/14* | (2006.01) |
| *H04N 21/431* | (2011.01) |
| *H04N 21/4788* | (2011.01) |
| *G02B 27/00* | (2006.01) |
| *G02B 27/01* | (2006.01) |
| *G06K 9/00* | (2006.01) |
| *G10L 25/48* | (2013.01) |

(52) U.S. Cl.
CPC ......... *H04N 7/155* (2013.01); *G02B 27/0093* (2013.01); *G02B 27/017* (2013.01); *G06K 9/00288* (2013.01); *H04N 7/142* (2013.01); *H04N 7/144* (2013.01); *H04N 7/147* (2013.01); *H04N 21/431* (2013.01); *H04N 21/4788* (2013.01); *G10L 25/48* (2013.01); *H04N 2007/145* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0004955 | A1* | 1/2008 | Mathew | G06Q 30/02 705/14.52 |
| 2009/0192861 | A1* | 7/2009 | Suzuki | G06Q 10/109 705/7.19 |

(Continued)

FOREIGN PATENT DOCUMENTS

| | | |
|---|---|---|
| JP | 2007-281618 A | 10/2007 |
| JP | 2010-061265 A | 3/2010 |

(Continued)

*Primary Examiner* — Joseph J Nguyen
(74) *Attorney, Agent, or Firm* — Chip Law Group

(57) ABSTRACT

An information processing device including a display control unit configured to carry out control in a manner that a display unit disposed before eyes of a user displays past data relating to a recognized interlocutor, and a sharing setting control unit configured to carry out control in a manner that sharing of the past data with another person is set.

10 Claims, 28 Drawing Sheets

(56) References Cited

U.S. PATENT DOCUMENTS

| | | | |
|---|---|---|---|
| 2011/0221669 A1* | 9/2011 | Shams | G02B 27/017 345/156 |
| 2011/0320958 A1* | 12/2011 | Kashi | G06Q 10/1095 715/751 |
| 2012/0054278 A1* | 3/2012 | Taleb | G06Q 50/01 709/204 |
| 2012/0084192 A1* | 4/2012 | Guyton | G06Q 40/04 705/37 |
| 2013/0080264 A1* | 3/2013 | Umeda | G06Q 30/02 705/14.69 |
| 2013/0169680 A1* | 7/2013 | Chien | G06F 3/04815 345/633 |
| 2013/0339025 A1* | 12/2013 | Suhami | H04R 25/00 704/271 |
| 2014/0068665 A1* | 3/2014 | Evans | H04N 21/4781 725/37 |

FOREIGN PATENT DOCUMENTS

| | | | |
|---|---|---|---|
| JP | 2010061265 | * | 3/2010 |
| JP | 2011-250100 A | | 12/2011 |
| JP | 2012-137902 A | | 7/2012 |
| JP | 2012-249164 A | | 12/2012 |

* cited by examiner

FIG. 3
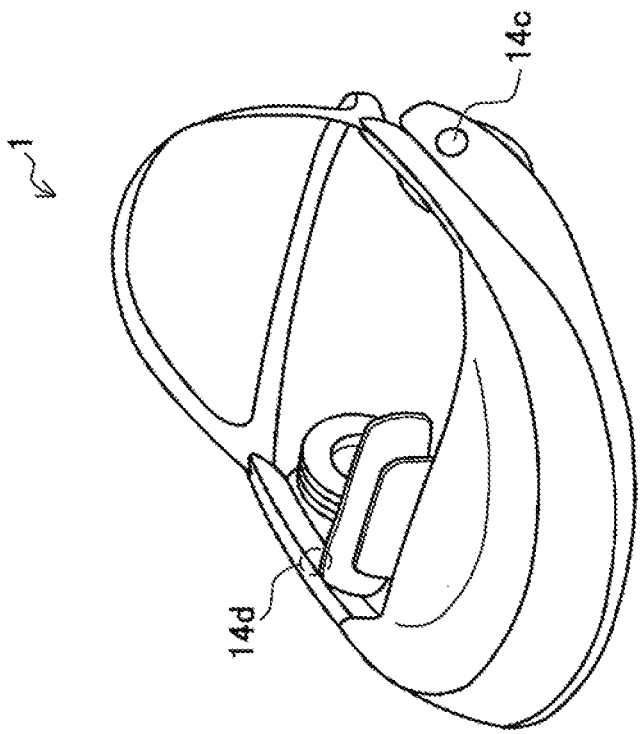
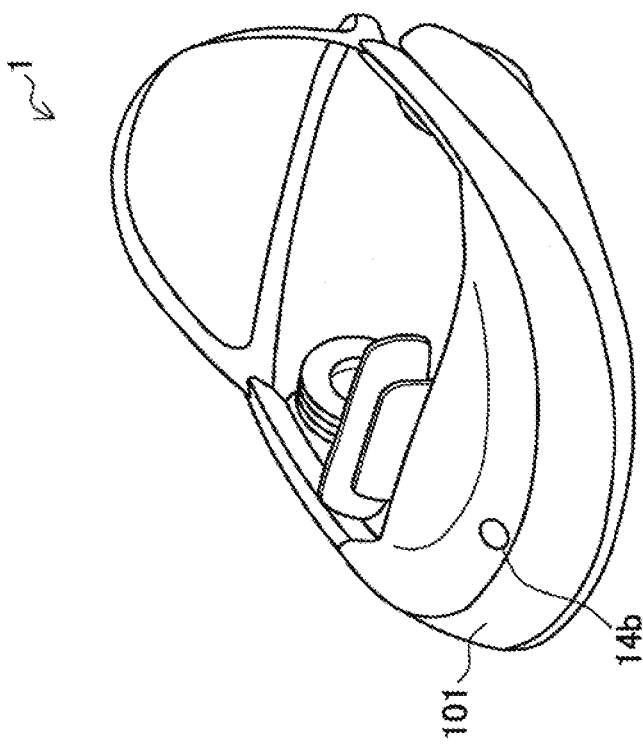

VIEW GROUPS OF MATERIALS BY FLICK OPERATION

FIG. 14
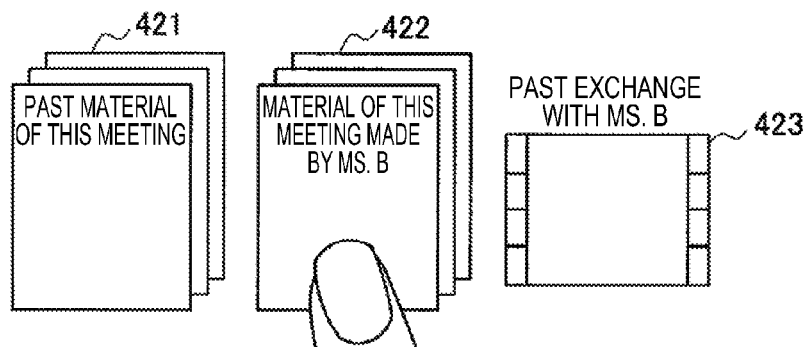
DISPLAY DETAILS OF GROUP OF MATERIALS BY TAPPING OPERATION
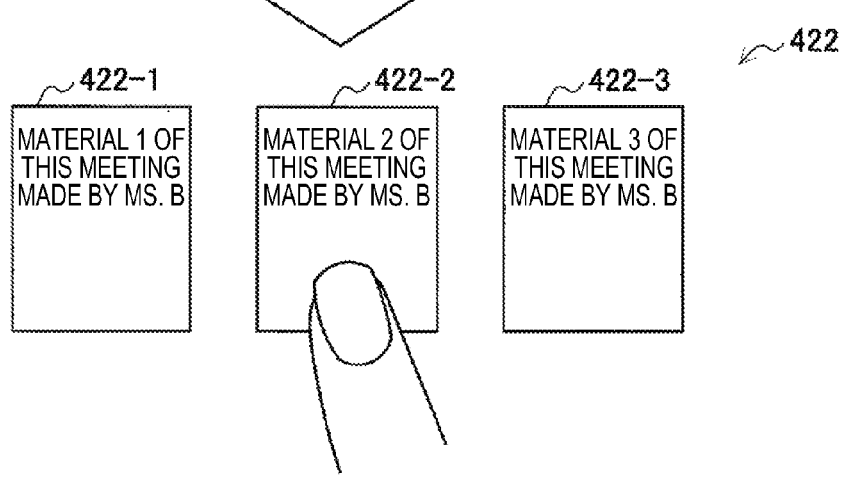
DISPLAY DETAILS OF GROUP OF MATERIALS BY TAPPING OPERATION
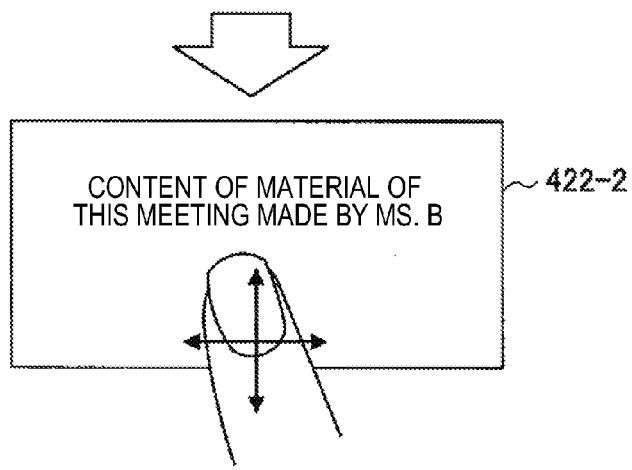
SCROLL CONTENT OF MATERIAL BY FLICK OPERATIONS

FIG. 16
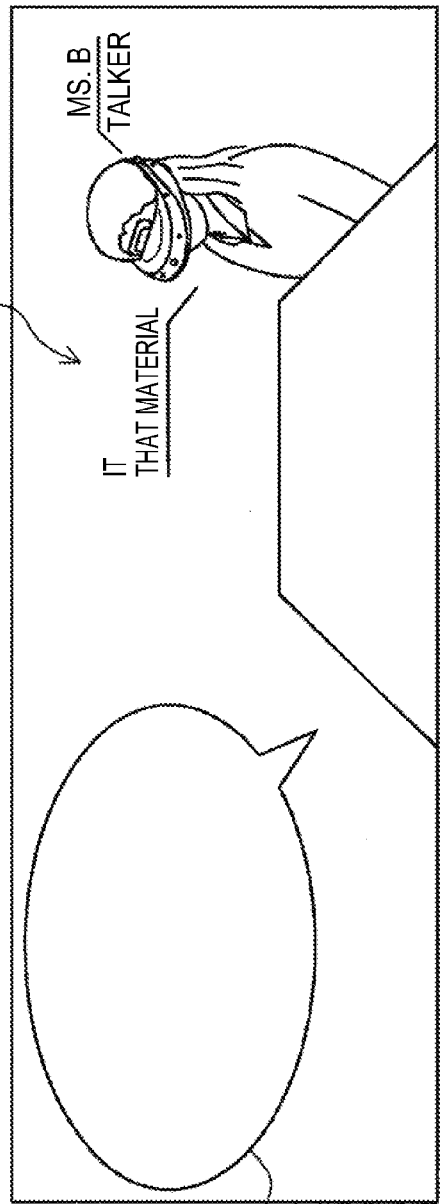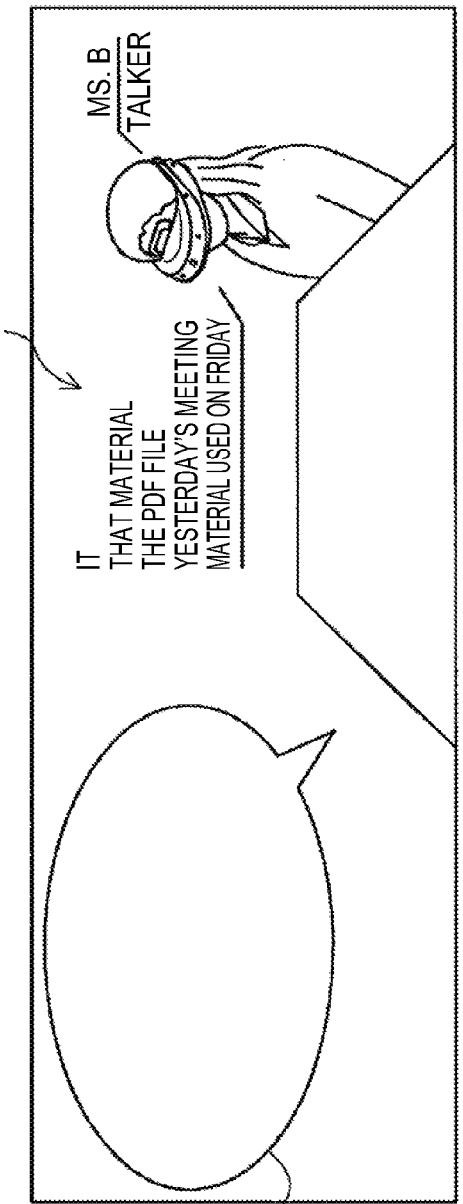

FIG. 18
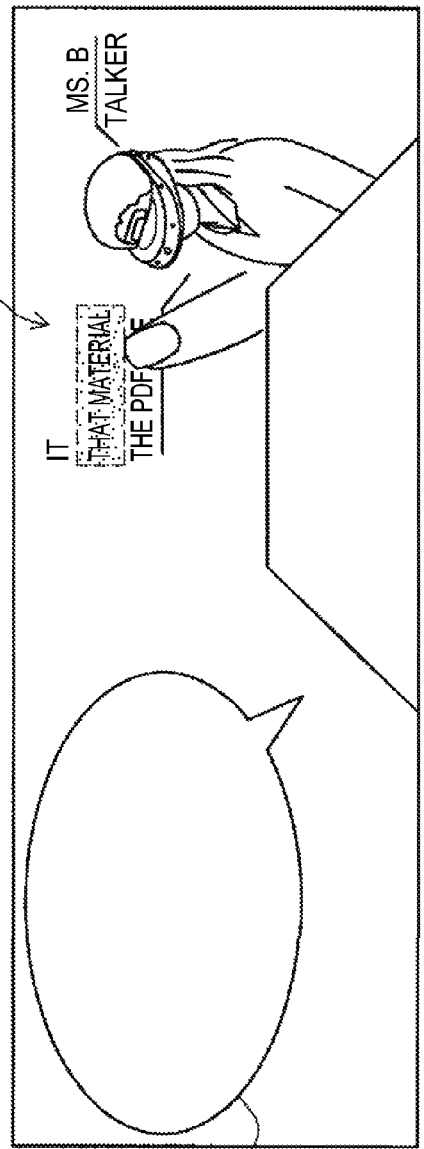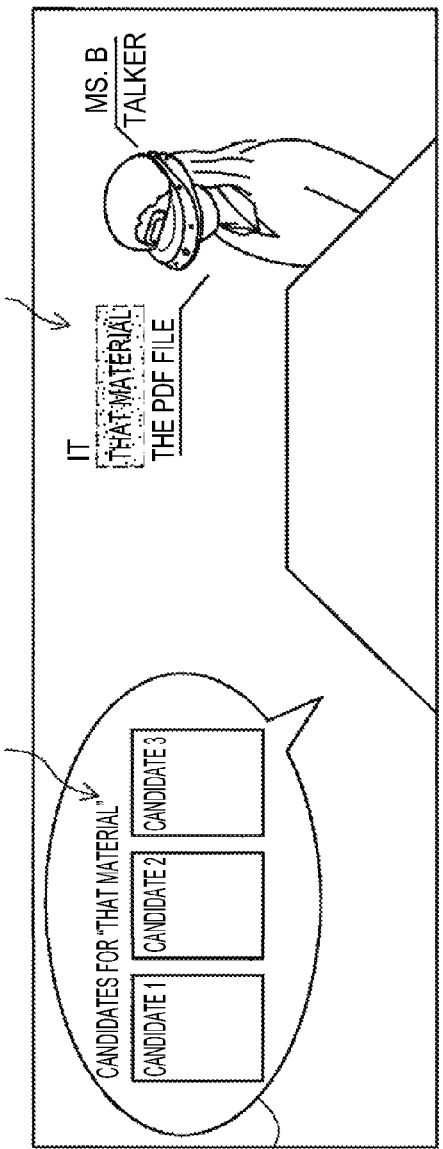

FIG. 20

CANDIDATES FOR "THAT"

| CANDIDATES FOR "THAT" | FORMAL NAME OF MATERIAL | METADATA | | | | SCORE (CALCULATED BASED ON NUMBER OF KEYWORDS EXTRACTED FROM CONVERSATION BEFORE AND AFTER "THAT") | ORDER OF PRIORITY |
|---|---|---|---|---|---|---|---|
| | | TIME | LOCATION | PERSON | DETAILS OF CONTENT | | |
| CANDIDATE 1 | FFF.PPT | 2013/12/20 | MEETING ROOM G | MR. A<br>MS. B | DESIGN MATERIALS<br>PRESS RELEASE | 0.7 | 1 |
| CANDIDATE 2 | GGG.DOC | 2013/12/1 | VENUE FOR ACADEMIC MEETING (XX UNIVERSITY) | MR. A | STUDY RESULTS<br>FUTURE PLAN | 0.4 | 2 |
| CANDIDATE 3 | HHH.JPEG | 2013/8/20 | DINING HALL | MS. B<br>MS. C<br>MR. D<br>MR. E | PRIVATE<br>LUNCH<br>FAREWELL PARTY | 0.01 | 3 |

※ SCORES ARE CALCULATED FROM NUMBER OF PIECES OF METADATA AND METADATA OF FREQUENCY/ PARAMETER

FIG.21

EXPANDING METADATA BY FEEDBACK LEARNING (ADD, TO METADATA, KEYWORDS DERIVED FROM CORRECT ANSWER SOLUTION)

| CANDIDATES FOR "THAT" | FORMAL NAME OF MATERIAL | METADATA | | | | SCORE (CALCULATED BASED ON NUMBER OF KEYWORDS EXTRACTED FROM CONVERSATION BEFORE AND AFTER "THAT") | ORDER OF PRIORITY |
|---|---|---|---|---|---|---|---|
| | | TIME | LOCATION | PERSON | DETAILS OF CONTENT | | |
| CANDIDATE 1 | FFF.PPT | 2013/12/20 END OF YEAR | MEETING ROOM G | MR. A MS. B MS. C | DESIGN MATERIALS PRESS RELEASE FOLDER J | 0.7 (CORRECT ANSWER) | 1 |
| CANDIDATE 2 | GGG.DOC | 2013/12/1 | VENUE FOR ACADEMIC MEETING (XX UNIVERSITY) | MR. A | STUDY RESULTS FUTURE PLAN | 0.4 | 2 |
| CANDIDATE 3 | HHH.JPEG | 2013/8/20 | DINING HALL | MS. B MS. C MR. D MR. E | PRIVATE LUNCH FAREWELL PARTY | 0.01 | 3 |

INFORMATION PROCESSING DEVICE, CONTROL METHOD, AND SYSTEM

CROSS REFERENCE TO RELATED APPLICATIONS

This application is a U.S. National Phase of International Patent Application No. PCT/JP2014/081776 filed on Dec. 1, 2014, which claims priority benefit of Japanese Patent Application No. JP 2014-028426 filed in the Japan Patent Office on Feb. 18, 2014. Each of the above-referenced applications is hereby incorporated herein by reference in its entirety.

TECHNICAL FIELD

The present disclosure relates to information processing devices, control methods, programs, and systems.

BACKGROUND ART

In recent years, various technologies relating to a head-mounded display (HMD) that is a wearable device mounted on a head have been proposed. For example, Patent Literature 1 discloses a technology for visually showing environmental sound to a user in a more effective way in the case where the user is wearing the head-mounted display and watching content.

In the case of a glasses-type HMD having a translucent display unit corresponding to lenses, the user can wear the HMD all the time without any problem with his/her daily life. It is also possible for the user to routinely wear such an HMD, continuously record surroundings of the user by a sound collection unit and an imaging unit provided in the HMD, and accumulate his/her lifelog in a storage (including cloud storage) accessible for the user.

In addition to the lifelog, a group of information (document, image, link information of web site, etc.) clipped on a regular basis by the user using the information processing device such as a smartphone or a tablet terminal may be saved as data accumulated in the storage.

CITATION LIST

Patent Literature

Patent Literature 1: JP 2011-250100A

SUMMARY OF INVENTION

Technical Problem

When a user is with an interlocutor in a meeting in a real space or the user is connected to the interlocutor via a video conference, sometimes the user recalls past memory relating to the interlocutor. For example, the user recalls past exchange of e-mails with the interlocutor, details of past conference with the interlocutor, and the like.

If the user can share the recalled past memory with the interlocutor, the better discussion can be carried on.

However, the above described related art never consider such needs.

Therefore, the present disclosure proposes an information processing device, control method, program, and system capable of sharing past data relating to an interlocutor with the interlocutor.

Solution to Problem

According to the present disclosure, there is provided an information processing device including: a display control unit configured to carry out control in a manner that a display unit disposed before eyes of a user displays past data relating to a recognized interlocutor; and a sharing setting control unit configured to carry out control in a manner that sharing of the past data with another person is set.

According to the present disclosure, there is provided a control method including: carrying out control in a manner that a display unit disposed before eyes of a user displays past data relating to a recognized interlocutor; and carrying out control in a manner that sharing of the past data with another person is set.

According to the present disclosure, there is provided a program for causing a computer to function as: a display control unit configured to carry out control in a manner that a display unit disposed before eyes of a user displays past data relating to a recognized interlocutor; and a sharing setting control unit configured to carry out control in a manner that sharing of the past data with another person is set.

According to the present disclosure, there is provided a system including: a server configured to store past data of each user; a wearable device configured to be mounted on a head of a user and to have a display unit disposed before eyes of the user; and a user terminal including a display control unit configured to carry out control in a manner that the display unit displays past data acquired from the server, the past data relating to a recognized interlocutor, and a sharing setting control unit configured to carry out control in a manner that sharing of the past data with another person is set.

Advantageous Effects of Invention

According to the present disclosure as described above, it is possible to share past data relating to the interlocutor with the interlocutor.

In addition, the effects described in the present specification are merely illustrative and demonstrative, and not limitative. In other words, the technology according to the present disclosure can exhibit other effects that are evident to those skilled in the art along with or instead of the effects based on the present specification.

BRIEF DESCRIPTION OF DRAWINGS

FIG. 3 is a diagram supplementally illustrating an installation position of an imaging unit provided in an HMD according to the embodiment.

FIG. 14 is an explanatory diagram illustrating a case of viewing a content of one of materials.

FIG. 16 is an explanatory diagram illustrating a keyword display example.

FIG. 18 is a diagram illustrating an example of a keyword search result display screen.

FIG. 20 is a diagram illustrating an example of a list of candidates for "it" based on comparison.

FIG. 21 is an explanatory diagram illustrating a case of expanding metadata by feedback learning.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Note that the description is given in the following order.
1. Overview of Information Sharing System according to Embodiment of Present Disclosure
2. Basic Configuration
2-1. Configuration of HMD
2-2. Configuration of User Terminal
2-3. Configuration of Cloud Storage
3. Operation Process
3-1. Lifelog Saving Process
3-2. Metadata Generation Process
3-3. Start Process
3-4. Search Process
3-5. Keyword Search Process
3-6. Sharing Process
3-7. Shared Material Copy Process
4. Conclusion <<1. Overview of Information Sharing System According to Embodiment of Present Disclosure>>

Figure 1:
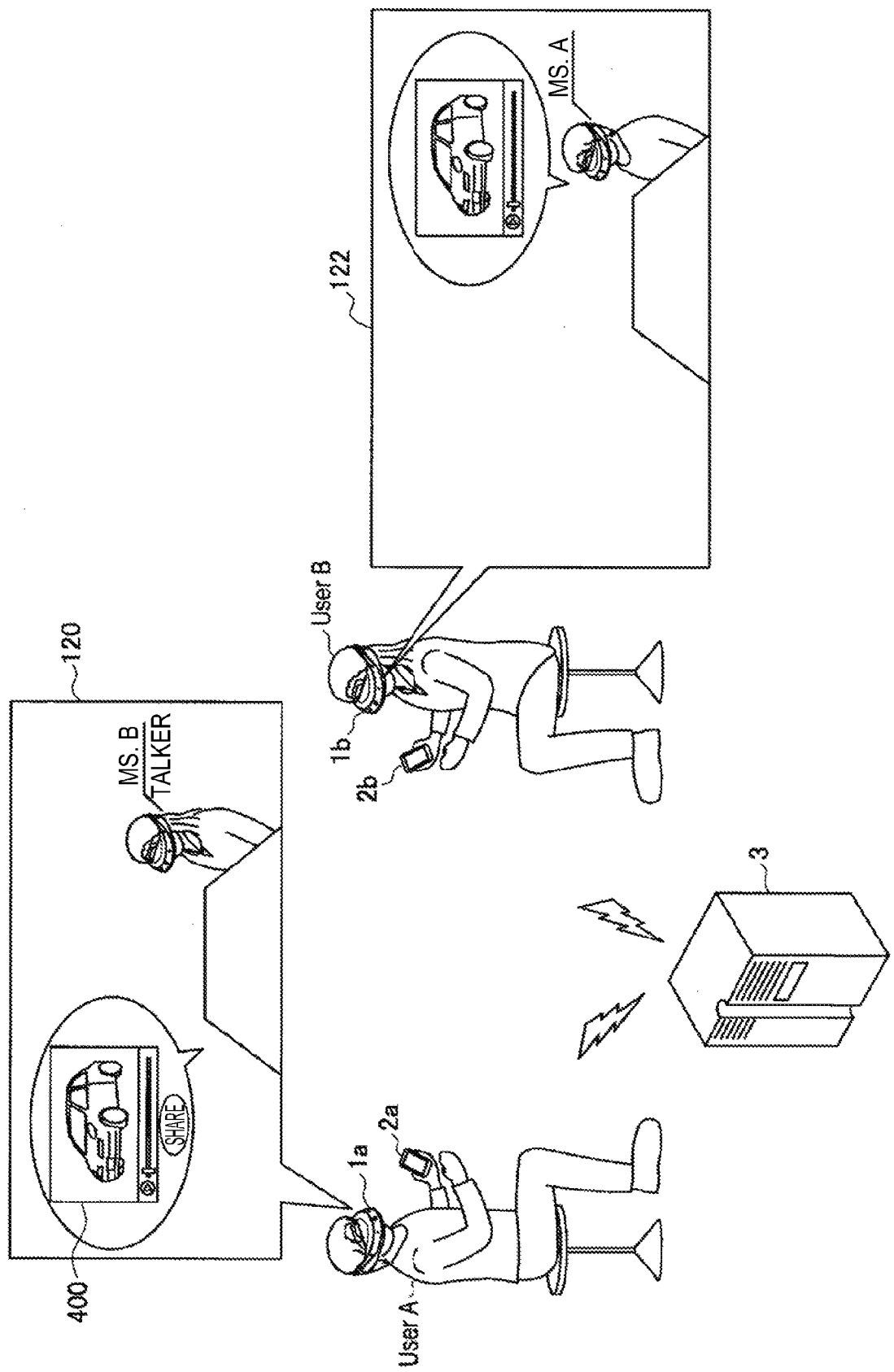
FIG. 1 is an explanatory diagram illustrating an overview of an information sharing system according to an embodiment of the present disclosure.

With reference to FIG. 1, an overview of an information sharing system according to an embodiment of the present disclosure will be described. As illustrated in FIG. 1, the information sharing system according to the embodiment includes a head-mounted display (HMD) 1 that is an example of a wearable device to be mounted on the head of a user, a user terminal 2 implemented by a smartphone, a tablet terminal, or the like, and a cloud storage 3.

The HMD 1, the user terminal 2, and the cloud storage 3 are connected to each other in a wired/wireless manner, and are capable of transmitting/receiving data. For example, they may be connected via a communication method such as a wireless local area network (LAN), Wireless Fidelity (Wi-Fi) (registered trademark), infrared communication, or Bluetooth (registered trademark). In addition, the cloud storage 3 is connected to the HMD 1 and the user terminal 2 via an access point (AP) connected to a network.

(Background)

When a user A is with a user B in a meeting in a real space or the user A is connected to the user B via a video conference, sometimes the users recall past memory relating to the interlocutor such as details of a past conference. However, it is difficult to recall accurate details of a material. In addition, if the users can share the recalled past memory with the interlocutor, the better discussion can be carried on. However, the above described related art never consider sharing of the recalled past memory (recall data).

According to the embodiment, it is possible to visually share the past data (recall data) with an interlocutor, the past data relating to an interlocutor that the user has recalled when the user has been with another person.

For example the following steps are carried out on the premise that lifelogs of the user A and a group of information (document, photograph, link thereto) clipped by the user A using a user terminal 2A are saved on a regular basis in any storage (for example, cloud storage 3) whose access authority has been granted to the user A.

First, in the case where the user A wearing the HMD 1a and the user A wearing the HMD 1b are carrying out discussion while the user A is with the user B in the same place or the user A is connected to the user B via a video conference as illustrated in FIG. 1, the user A makes a motion of recalling past memory, and thereby information relating to the user B who is the interlocutor is shown to the user A. In general, when a person recalls past memory, the person imagines the past painterly or graphically, and uses his/her right brain that is intuitive brain to picture the past. Therefore, his/her gaze is turned to upper left that is opposite of the right brain position. Accordingly, for example, an HMD 1a uses motion of the gaze of the user A to the upper left as a trigger to display information relating to the user B who is the interlocutor on the display unit (display unit 12 illustrated in FIG. 2B) of the HMD 1a and show the information to the user A.

Examples of the information relating to the user B who is the interlocutor include past exchange of e-mails with the user B, details of past conference with the interlocutor, and the like. Here, for example, as illustrated in FIG. 1, moving image data 400 recently transmitted by the user B is displayed on the upper left side of the field of view 120 of the user A via the display unit 12 of the HMD 1a. The moving image data 400 is acquired from the cloud storage 3 via the user terminal 2a, and displayed on the display unit 12 of the HMD 1a under the control of the user terminal 2a. The HMD 1a may show a plurality of pieces of information relating to the user B, and may cause the user A to select one of the pieces of information by gaze operation, finger pointing operation, flick operation on the user terminal 2a, or the like.

Next, in the case of sharing the shown moving image data 400 with the interlocutor, the user A instructs to configure a sharing setting of the moving image data 400. Thereby, the user terminal 2a notifies a user terminal 2b of an instruction to share the moving image data 400, and the user terminal 2b carries out control in a manner that the display unit 12 of the HMD worn by the user B displays the moving image data 400. At this time, as illustrated in FIG. 1, the user terminal 2b carries out control in a manner that a field of view 122 of the user B via the display unit 12 displays the moving image data 400 above the head of the user A. The user B can thereby visually recognize the past data (recall data) recalled by the user A and can carry out discussion while sharing the memory.

In addition, the user B can playback the shared moving image data 400 and copy the shared moving image data 400 to his/her own storage by gaze operation, finger pointing operation, flick operation on the user terminal 2b, or the like.

The overview of the information sharing system according to the embodiment of the present disclosure has been described. Next, with reference to FIGS. 2 to 5, basic configurations of the HMD 1, the user terminal 2, and the cloud storage 3 that are included in the information sharing system according to the present disclosure will be described.

<<2. Basic Configuration>>
<2-1. Configuration of HMD>

First, with reference to FIG. 2 to FIG. 3, external appearance and the internal configuration of the HMD 1 to be mounted on the head of a user will be described.

(2-1-1. Exterior Configuration)

Figure 2A:
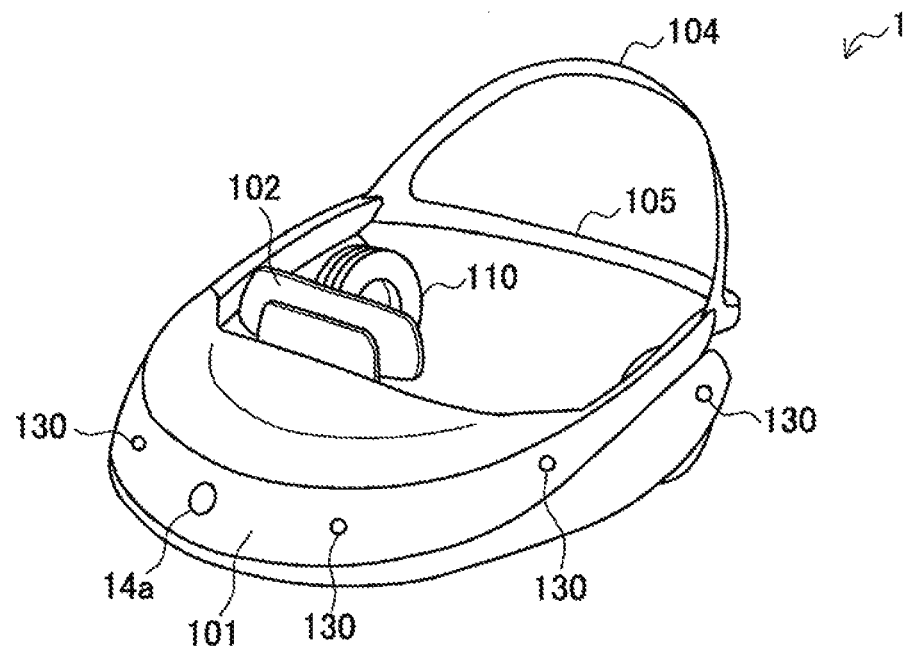
FIG. 2A is a diagram illustrating an example of external appearance of an HMD according to the embodiment in one direction.
Figure 2B:
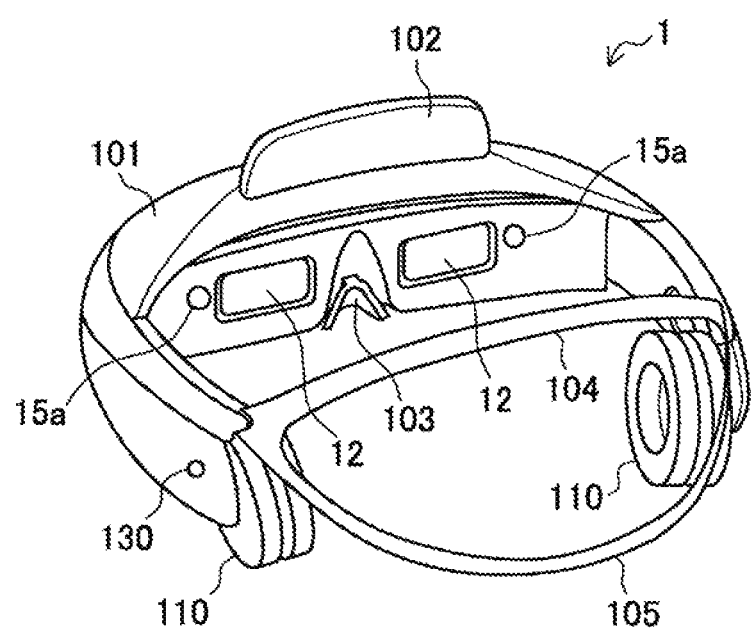
FIG. 2B is a diagram illustrating an example of external appearance of an HMD according to the embodiment in another direction.

FIG. 2A and FIG. 2B are each a diagram illustrating an example of external appearance of the HMD 1 according to the embodiment in each direction. As illustrated in FIG. 2A and FIG. 2B, the HMD 1 according to the embodiment is shaped like a cap. Even when a heavy load is on the front side of the main body, the load of the device is spread throughout the head, and this enables reduction of a burden on the user while the HMD1 is worn by the user. Specifically, the HMD 1 includes the main body 101, a forehead pad 102 protruding from the upper surface of the main body part 101, a head band diverged into an upper band 104 and a lower band 105, and right and left headphones 110. The main body 101 includes most parts such as a display system. The main body 101 contains display units 12 and a circuit board. In addition, below the main body 101, a nose pad 103 along a nasal bridge is formed in an appropriate shape.

An imaging lens 14a is provided in the front side of the main body 101 of the HMD 1. The imaging lens 14a is implemented by an omnidirectional camera lens or a fisheye lens, for example. The imaging lens 14a is externally attached to or is embedded in the HMD 1. Accordingly, the HMD 1 is capable of imaging a 180 to 360 degree view of its circumference. An image captured by the fisheye lens is used after distortion correction. Alternatively, a plurality of imaging lenses may be arrayed to image a 360 degree view of a circumference.

The installation position of the imaging lens 14a is not limited to the example illustrated in FIG. 2A. For example, as illustrated in the left of FIG. 3, an imaging lens 14b implemented by an omnidirectional camera lens or a fisheye lens may be provided at the upper surface of the main body 101. Alternatively, as illustrated in the right of FIG. 3, imaging lenses 14c and 14d may be provided at left and right temple parts, respectively. In this case, images of a 180 degree view captured by the imaging lenses 14c and 14d are used after corrected to be an image of a 360 degree view.

The head band is made from soft non-stretch material such as nylon or polypropylene. The upper band 104 is soft and curves along the head to support the load when the HMD 1 is worn. However, the upper band 104 is less likely to stretch, and this enables to prevent fall of the HMD 1. Although the lower band 105 is made from stretch material such as silicon rubber or elastomer, the lower band 105 can be integrated with the upper band 104 by double mold of dissimilar materials.

A pair of display units 12 of the HMD 1 for left and right eyes is disposed in front of eyes of the user when the HMD 1 is worn by the user. The display units 12 display images of a real space captured by the imaging lens 14a, for example.

A plurality of microphones 130 (also referred to as microphone array 130) that collect external sound are disposed on the front side, left side, and right side of the main body 101 of the HMD 1.

In addition, in the vicinity of the display units 12 inside the main body 101 of the HMD 1, imaging lenses 15a that detects gaze of the user are provided to face inward.

Details of the exterior configuration of the HMD 1 have been described. However, the configuration of the mounting parts (forehead pad 102, upper band 104, and lower band 105) of the HMD 1 illustrated in FIG. 2A and FIG. 2B are mere examples. It is possible to adopt various configurations of the HMD 1 to be worn by the user. It is only necessary to form the HMD 1 by a mounting unit generally called a glasses-type unit or a head-mounted unit. In at least the embodiment, it is only necessary to provide the display units 12 near the front of the eyes of the user.

The display units 12 may be translucent. When the HMD 1 puts the display units 12 into a through state, in other words, into transparent or translucent state, the user can visually recognize the real space via the display units 12 in the through state. This enables no interruption in daily life while wearing the HMD 1 at all times like glasses. In this case, the pair of display units 12 corresponding to both eyes may be provided, or only one display unit 12 corresponding to one eye may be provided.

The left and right headphones 110 are not limited to stereo speakers. Only one headphone 100 may be provided to be mounted on one ear. Alternatively, the HMD 1 does not have to include the headphones 100. According to an internal configuration example (see FIG. 4) to be described below, the HMD 1 does not include the headphones 100 (sound output unit).

(2-1-2. Internal Configuration)

Figure 4:
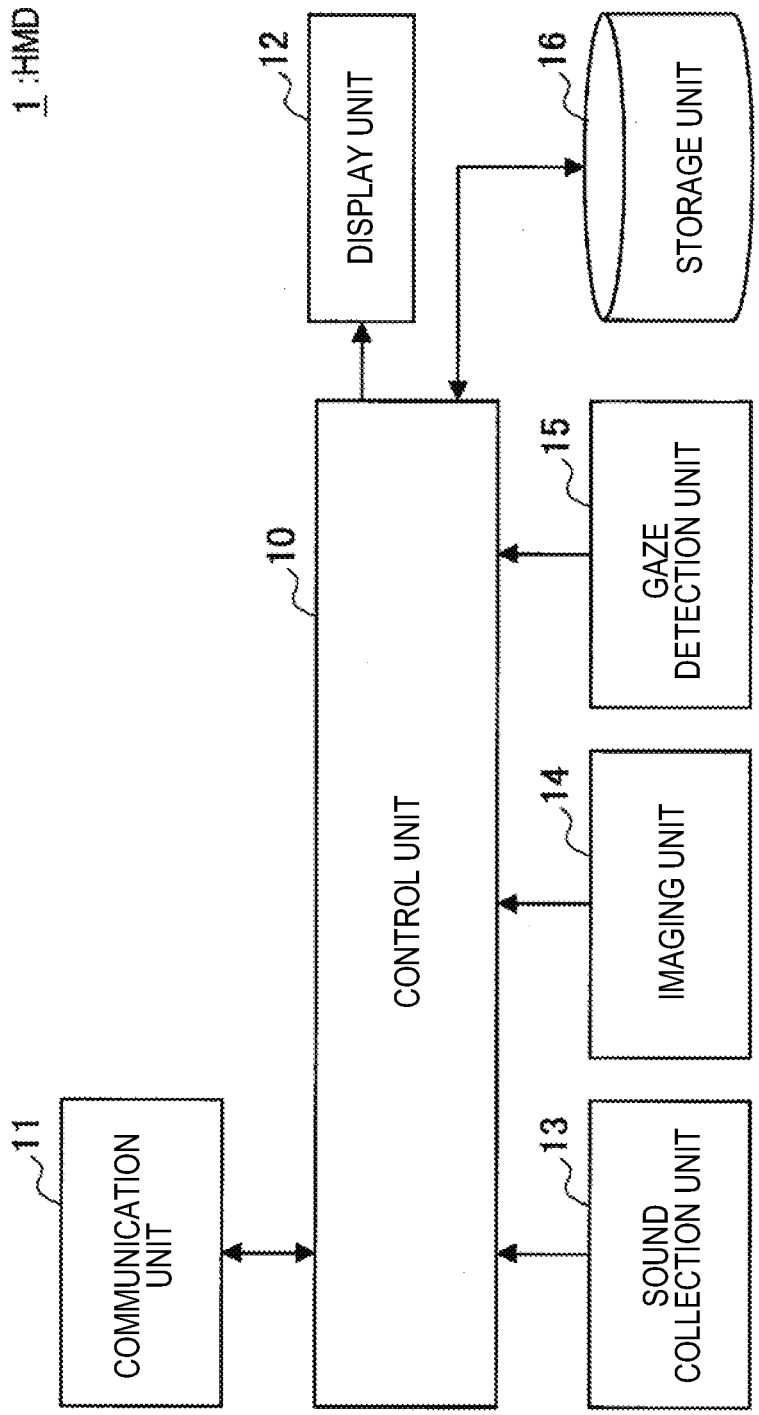
FIG. 4 is a block diagram illustrating an internal configuration example of an HMD according to the embodiment.

Next, with reference to FIG. 4, the internal configuration of the HMD 1 according to the embodiment will be described. FIG. 4 is a block diagram illustrating the internal configuration example of the HMD 1 according to the embodiment. As illustrated in FIG. 4, the HMD 1 includes a control unit 10, a communication unit 11, a display unit 12, a sound collection unit 13, an imaging unit 14, a gaze detection unit 15, and a storage unit 16.

(Control Unit 10)

The control unit 10 is implemented by a microcontroller including a central processing unit (CPU), read only memory (ROM), random access memory (RAM), non-volatile memory, and an interface unit, for example. The control unit 10 controls respective structural elements of the HMD 1.

The control unit 10 according to the embodiment carries out control in a manner that data acquired by the sound collection unit 13, the imaging unit 14, and the gaze detection unit 15 is transmitted to the user terminal 2 or the cloud storage 3 via the communication unit 11, for example. In addition, the control unit 10 carries out control in a manner that the display unit 12 displays the data in response to an instruction received from the user terminal 2 via the communication unit 11.

(Communication Unit 11)

The communication unit 11 exchanges data with an external apparatus. For example, the communication unit 11 is wirelessly connected to the user terminal 2 by using Wi-Fi, Bluetooth (registered trademark), or the like to exchange data.

(Display Unit 12)

The display unit 12 displays image data under the control of the control unit 10. Specifically, the display unit 12 according to the embodiment displays past data relating to the interlocutor in the upper left side viewed from the wearer.

(Sound Collection Unit 13)

The sound collection unit 13 includes the microphone array 130 illustrated in FIG. 2A, a microphone amplifier, and an A/D converter to output sound data to the control unit 10, for example. The microphone amplifier performs an amplification process on sound signals acquired by the microphone array 130. The sound data to be output from the sound collection unit 13 may be output to the control unit 10 via a signal processing unit (not illustrated) that removes noise from the sound data and that performs a sound source separation process or the like on the sound data. Alternatively, the control unit 10 may perform such a sound signal process.

(Imaging Unit 14)

The imaging unit 14 includes a lens system, a drive system, solid state image sensor array, and the like. The lens system includes an imaging lens 14a, a diaphragm, a zoom lens, a focus lens, and the like. The drive system causes the lens system to carry out a focus movement and a zoom movement. The solid state image sensor array performs photoelectric conversion on imaging light acquired by the lens system to generate an imaging signal. The solid state image sensor array may be implemented by charge-coupled device (CCD) sensor array or complementary metal-oxide-semiconductor (CMOS) sensor array, for example.

(Gaze Detection Unit 15)

The gaze detection unit 15 has a function of detecting a gaze position of the wearer to output a result of the detection to the control unit 10. Specifically, for example, the gaze detection unit 15 is implemented by an imaging unit including the imaging lenses 15a provided to face inward (see FIG. 2B). In this case, the gaze detection unit 15 detects a gaze position by carrying out a process of recognizing central points of pupils on the basis of captured images of the eyes of the user.

(Storage Unit 16)

The storage unit 16 stores a program to be used for executing various processes to be carried out by the control unit 10.

The internal configuration of the HMD 1 has been described above. Note that, the configuration of the HMD 1 illustrated in FIG. 4 is a mare example. The configuration of the HMD 1 is not limited thereto. For example, the HMD 1 may further include an illumination unit, a sound output unit, and the like.

<2-2. Configuration of User Terminal>

Figure 5:
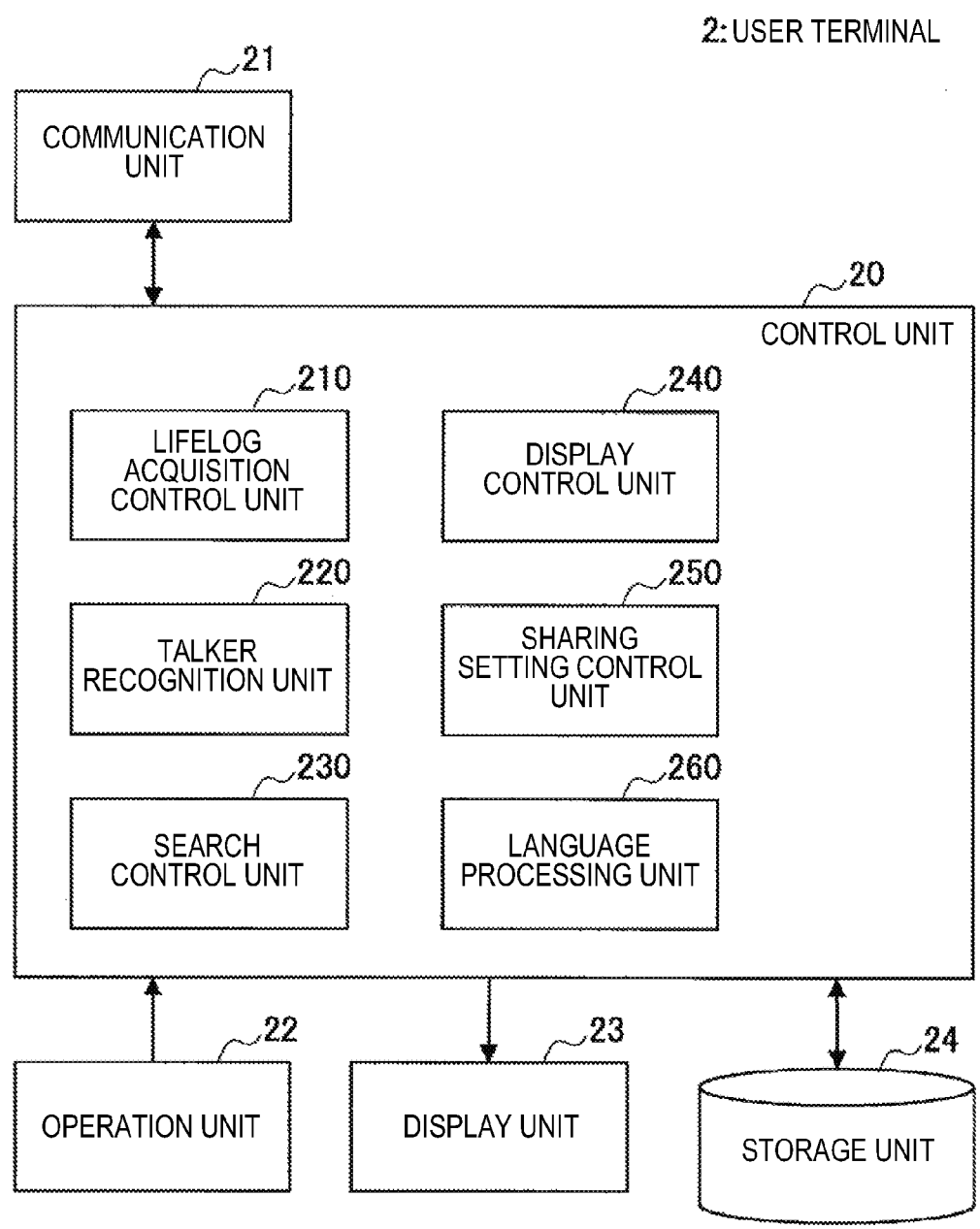
FIG. 5 is a block diagram illustrating a configuration example of a user terminal according to the embodiment.

FIG. 5 is a block diagram illustrating a configuration example of the user terminal 2 according to the embodiment. As illustrated in FIG. 5, the user terminal 2 includes a control unit 20, a communication unit 21, an operation unit 22, a display unit 23, and a storage unit 24.

(Control Unit 20)

The control unit 20 is constituted by a microcontroller including a CPU, ROM, RAM, non-volatile memory, and an interface unit, for example. The control unit 20 controls respective structural elements of the user terminal 2. In addition, as illustrated in FIG. 5, the control unit 20 functions as a lifelog acquisition control unit 210, a talker recognition unit 220, a search control unit 230, a display control unit 240, a sharing setting control unit 250, and a language processing unit 260.

The lifelog acquisition control unit 210 carries out control to continuously store circumstances around the user. Specifically, for example, the lifelog acquisition control unit 210 carries out control in a manner that sound data and image data acquired by the sound collection unit 13 and the imaging unit 14 of the HMD 1 are received from the HMD 1, and the sound data and image data are stored in the storage unit 24 or the cloud storage 3.

The talker recognition unit 220 recognizes the interlocutor on the basis of the sound data and image data transmitted from the HMD 1. Specifically, for example, the talker recognition unit 220 performs the sound source separation on the sound data to separate mixed sound data into each sound source. Accordingly, the talker recognition unit 220 is capable of separating the sound data into environmental sound, sound of speech of the user A himself, sound of speech of the interlocutor (user B), and the like. In addition, the talker recognition unit 220 may perform an analysis process on each sound data piece acquired by the sound source separation to generate direction data and distance data. The direction data indicates a direction of a sound source that emits each sound. The distance data indicates a distance to the sound source. The direction of the sound source of the sound and the distance from the sound source are based on the sound collection unit 13 such as the microphone array of the HMD 1 that has collected the sound. In the case where the sound data piece is the sound of speech, the talker recognition unit 220 recognizes the talker. Specifically, the talker recognition unit 220 refers to an image (image data) captured when the sound data has been acquired, recognizes a person (facial image) at a position consistent with the direction data indicating the direction of the sound source and/or the distance data indicating the distance as the talker, and identifies the talker by a face recognition process. It is also possible for the talker recognition unit 220 to identify the talker on the basis of a characteristic feature of the sound acquired by analyzing the sound data piece determined as the sound of speech.

The search control unit 230 has a function of searching for information (past data) relating to the interlocutor recognized by the talker recognition unit 220. Specifically, the search control unit 230 issues a search request to the cloud storage 3 or the storage unit 24 that is a local storage. Here, an area searched in the cloud storage 3 is a storage area accessible for the user. In this area, continuously accumulated lifelogs, a group of clipped and saved information, and data exchanged with another person, or the like is searched for. In the search, the search control unit 230 may search for past data relating to the interlocutor on the basis of metadata associated with the past data. Alternatively, the search control unit 230 may search the past data relating to the interlocutor by checking against a current date and time, a current location, or current schedule information of the user. For example, the search control unit 230 searches the past data relating to the interlocutor, for materials used in the past meetings that is the same kind of meetings as a meeting which the user is now attending.

The display control unit 240 may control display of the display unit 12 of the HMD 1 in addition to the display of the display unit 23 of the user terminal 2. For example, the display control unit 240 carries out control in a manner that the display unit 12 of the HMD 1 displays information (past data) relating to the interlocutor that has been searched for by the search control unit 230. Specifically, the display control unit 240 transmits the information relating to the interlocutor and a display instruction to the HMD 1 via the communication unit 21.

The sharing setting control unit 250 controls a setting of sharing the past data with another person. Specifically, in the case where the user is allowed to share the past data with the interlocutor, the sharing setting control unit 250 transmits the shareable past data to the user terminal of the interlocutor, and issues a sharing notification to the cloud storage 3.

The language processing unit 260 performs the language analysis process on the sound data acquired by the sound collection unit 13 of the HMD 1 and transmitted from the HMD 1, and extracts keywords such as a demonstrative and a noun. The extracted keywords are shown to the user as candidates for a search keyword of the past data relating to the interlocutor.

(Communication Unit 21)

The communication unit 21 exchanges data with an external apparatus. For example, the communication unit 21 is connected to the HMD 1 and the cloud storage 3 by using Wi-Fi, Bluetooth (registered trademark), or the like to exchange data.

(Operation Unit 22)

The operation unit 22 receives operation input by the user, and outputs the received input information to the control unit 20. The operation unit 22 is implemented by a button, a switch, a touch sensor that receives operation input to a display screen, etc.

(Display Unit 23)

The display unit 23 displays a predetermined display screen under the control of the display control unit 240 in the display unit 12. For example, the display unit 12 is implemented by a liquid crystal display (LCD), an organic light emitting diode (OLED), or the like.

(Storage Unit 24)

The storage unit 24 stores a program and the like to be used by the control unit 20 executing various processes. In the embodiment, the cloud storage 3 stores the lifelog, the group of document, and the like. However, the storage unit 24 that is an example of the local storage may store the lifelog, the group of document, and the like.

Details of the configuration example of the user terminal 2 have been described. Note that, the user terminal 2 is not limited to the smartphone illustrated in FIG. 1. The user terminal 2 may be a mobile phone, personal digital assistants (PDA), a personal computer (PC), a tablet terminal, or the like.

<2-3. Configuration of Cloud Storage>

Figure 6:
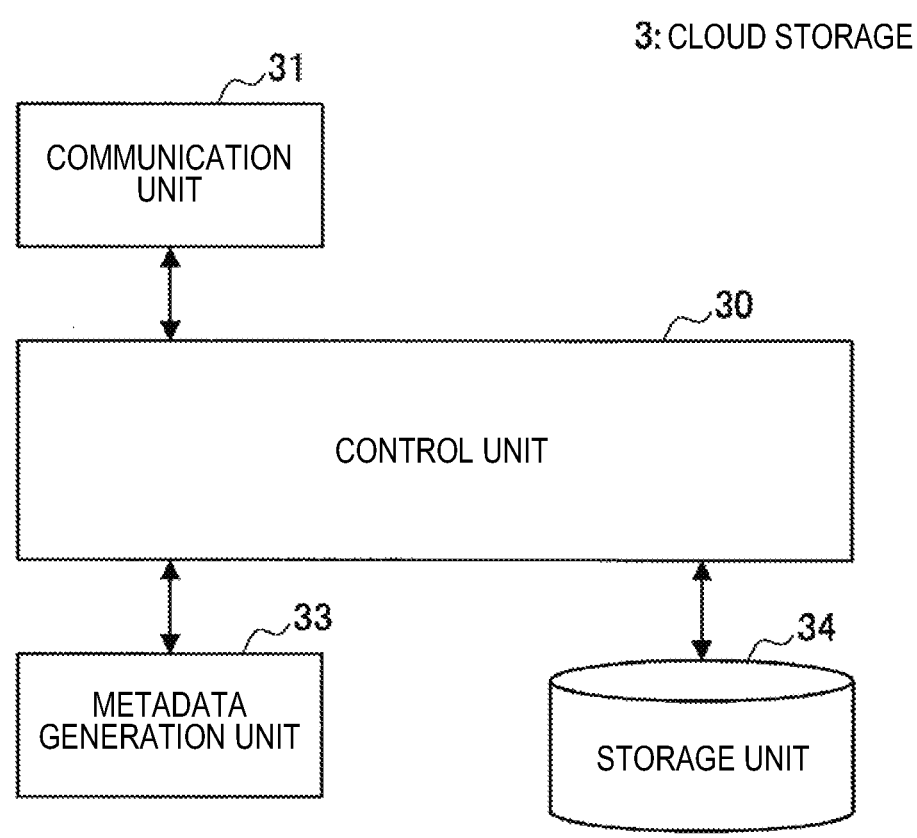
FIG. 6 is a block diagram illustrating a configuration example of a cloud storage according to the embodiment.

FIG. 6 is a block diagram illustrating a configuration example of the cloud storage 3 according to the embodiment. As illustrated in FIG. 6, the cloud storage 3 includes a control unit 30, a communication unit 31, a metadata generation unit 33, and a storage unit 34.

(Control Unit 30)

The control unit 30 is constituted by a microcontroller including a CPU, ROM, RAM, non-volatile memory, and an interface unit, for example. The control unit 30 controls respective structural elements of the cloud storage 3. For example, the control unit 30 has a function of searching the storage unit 34 for past data relating to an interlocutor in response to a request from the user terminal 2. In addition, the control unit 30 carries out control in a manner that the sound data, image data, a group of documents, and the like stored in the storage unit 34 are acquired and transmitted to the metadata generation unit 33, and metadata generated in the metadata generation unit 33 is associated with the respective sound data and the like and is stored in the storage unit 34.

(Communication Unit 31)

The communication unit 31 exchanges data with an external apparatus. For example, the communication unit 31 is connected to the user terminal 2 and the HMD 1 via a network to exchange data.

(Metadata Generation Unit 33)

The metadata generation unit 33 generates (extracts) metadata by analyzing sound data, image data (moving image/still image), a group of document, and the like that are stored in the storage unit 34. For example, with respect to the image data and the sound data, the metadata generation unit 33 generates, as the metadata, a sound/image recording date and time, a sound/image recording location, identification information of a subject/talker acquired by face/sound recognition, direction data and distance data of the subject/talker (sound source), an access authority (user name), sound recognition, data converted into text, and the like. With respect to the group of documents (text data), the metadata generation unit 33 generates, as the metadata, a date and time of use, a date and time of update, link information to a schedule of the user (for example, subject of meeting, attendance/company, etc.), details of content (for example, title), and the like.

(Storage Unit 34)

The storage unit 34 stores lifelogs (sound data, image data, etc.), a group of documents, schedule information of each user, and the like that have been transmitted from each user terminal 2. On the data stored in the storage unit 34, operation such as viewing, adding, and deleting is routinely performed by a user to which access authority has been granted.

The access authority is set for each piece of data stored in the storage unit 34, and the data may be set as private data of each user. In the case where another user is allowed to access target data in response to an instruction from the user to which access authority has been granted (in the case where the target data is shared), sometimes the target data is set as public data for users in a predetermined group.

Details of configurations of respective devices in the information sharing system according to the embodiment have been described. Next, an operation process of the information sharing system according to the embodiment will be described.

<<3. Operation Process>>

<3-1. Lifelog Saving Process>

Figure 7:
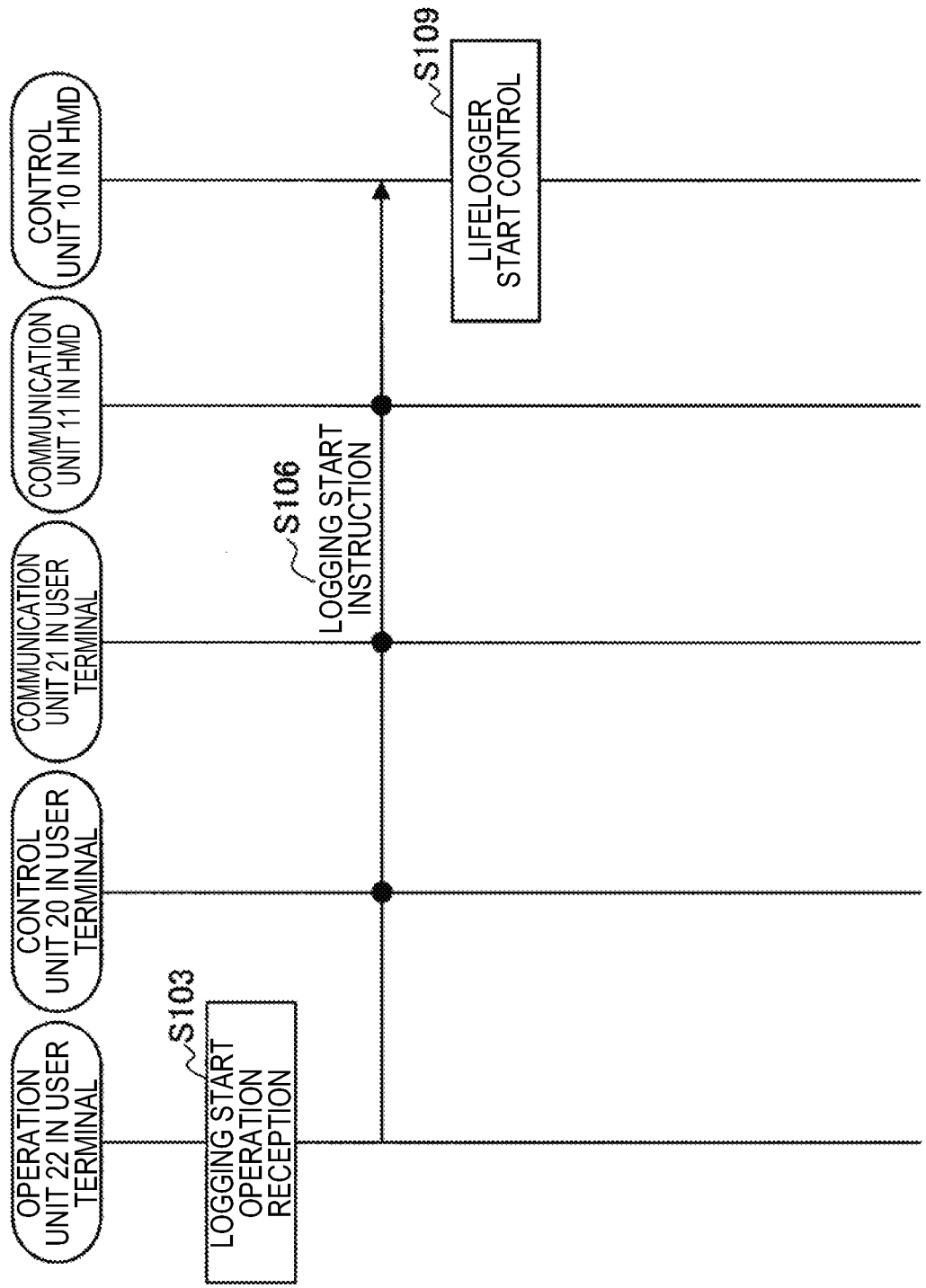
FIG. 7 is a sequence diagram illustrating a lifelog saving process according to the embodiment.

First, with reference to FIG. 7, a process of saving lifelogs of a user that are routinely accumulated in the cloud storage 3 included in the information sharing system will be described. FIG. 7 is a sequence diagram illustrating the lifelog saving process according to the embodiment.

As illustrated in FIG. 7, the operation unit 22 of the user terminal 2 receives logging start operation carried out by a user in Step S103.

In Step S106, the operation unit 22 then outputs a logging start instruction to the control unit 20, and the control unit 20 transmits the logging start instruction to the HMD 1 via the communication unit 21.

Next, in Step S109, the control unit 10 of the HMD 1 carries out a lifelogger start process (start of saving lifelogs).

Figure 8:
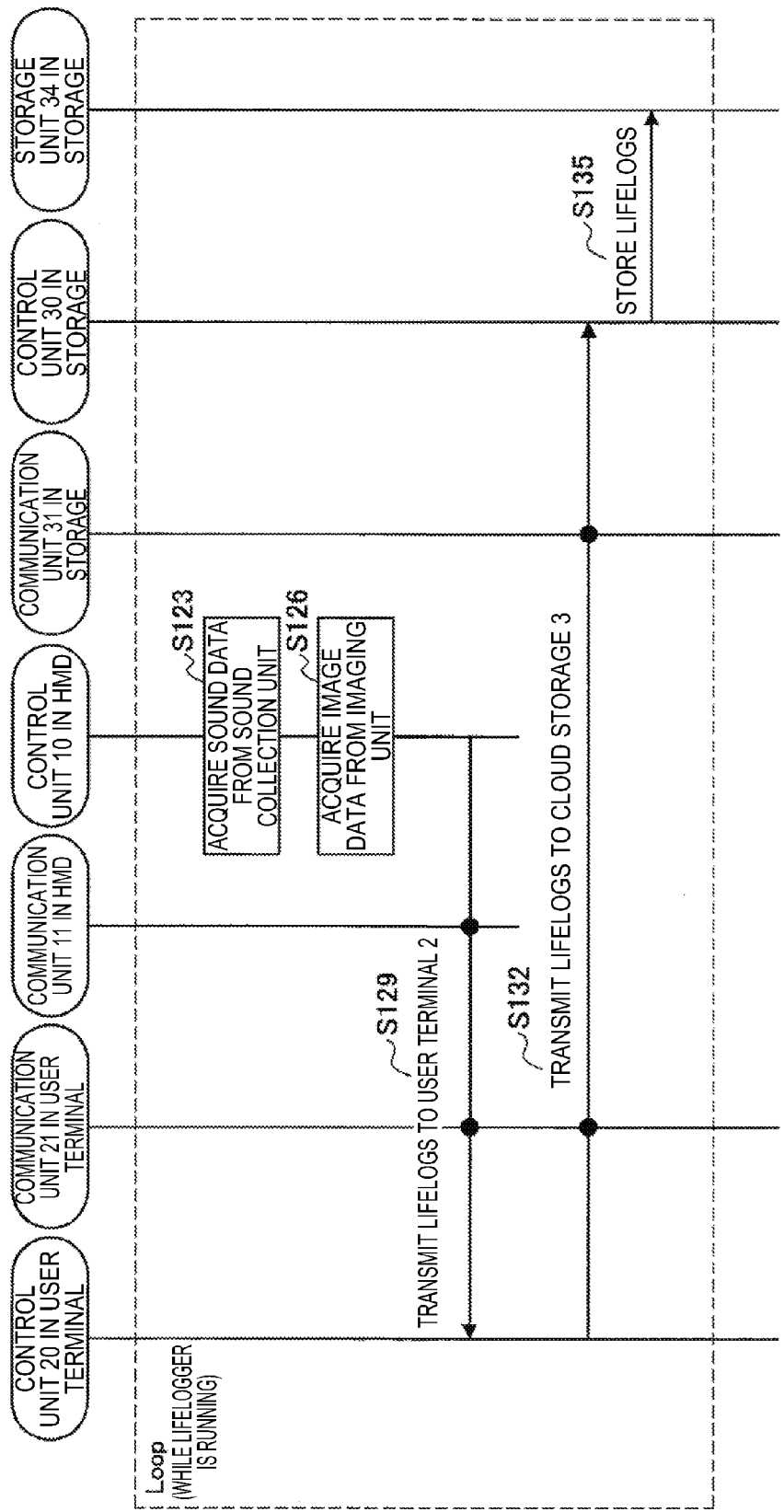
FIG. 8 is a sequence diagram illustrating an operation process while a lifelogger is running.

Subsequently, with reference to FIG. 8, an operation process after the lifelogger start process will be described. FIG. 8 is a sequence diagram illustrating an operation process while the lifelogger is running. As illustrated in FIG. 8, the control unit 10 of the HMD 1 acquires sound data collected by the sound collection unit 13 and image data (still image/moving image) captured by the imaging unit 14 as lifelogs in Steps S123 and S126.

Next, in Step S129, the control unit 10 transmits the acquired lifelogs (sound data and image data) to the user terminal 2 via the communication unit 11.

In Step S132, the control unit 20 of the user terminal 2 then functions as the lifelog acquisition control unit 210 to transmit the lifelogs received from the HMD 1 to the cloud storage 3.

Next, in Step S135, the control unit 30 of the cloud storage 3 stores the lifelogs received from the user terminal 2 via the communication unit 31, in a storage area accessible for a user in the storage unit 34.

The process in Steps S123 to S125 is repeatedly carried out while the lifelogger is running. This enables acquisition of circumstances and sounds around the user by the microphone array (example of sound collection unit 13) and a 360 degree camera (example of imaging unit 14) implemented by the omnidirectional camera or the fisheye lens, to accumulates the circumstances and sounds as the lifelogs in the cloud storage 3 at all times.

The data of the user accumulated in the cloud storage 3 is not limited to the sound data and image data. For example, the data of the user includes a group of documents (text data).

In addition, the data accumulated in the cloud storage 3 is not limited to the lifelog. For example, the data includes data (sound data, image data, and text data) registered by flick operation on the user terminal 2, data exchanged with another user, schedule information, and the like.

<3-2. Metadata Generation Process>

Figure 9:
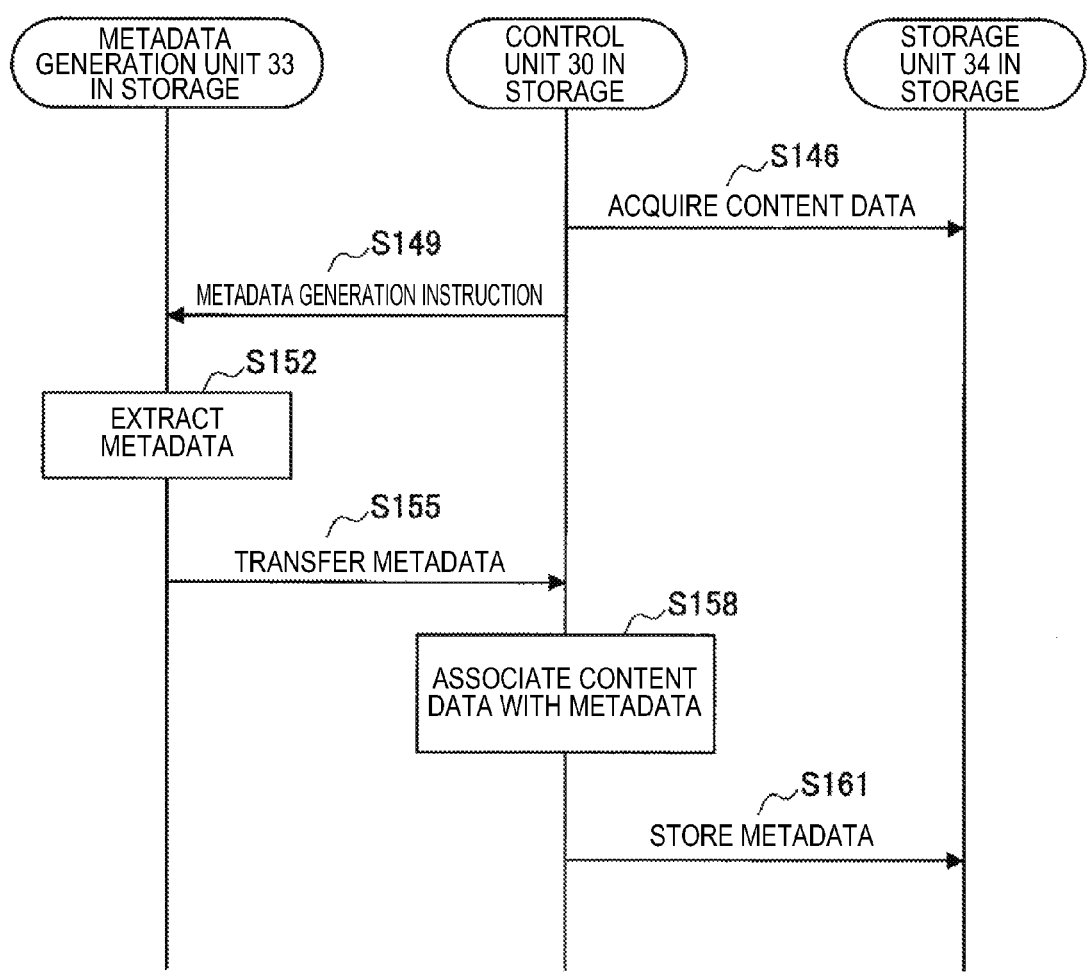
FIG. 9 is a sequence diagram illustrating a metadata generation process according to the embodiment.

Next, with reference to FIG. 9, generation of metadata of various data accumulated in the cloud storage will be described. FIG. 9 is a sequence diagram illustrating a metadata generation process according to the embodiment.

As illustrated in FIG. 9, first, the control unit 30 of the cloud storage 3 acquires various data (also referred to as content data) from the storage unit 34 in Step S146.

Next, in Step S149, the control unit 30 transfers the content data acquired from the storage unit 34 to the metadata generation unit 33, and issues a metadata generation instruction.

In Step S152, the metadata generation unit 33 then analyzes the content data to extract metadata. Specifically, as described above, with respect to the image data and the sound data, a sound/image recording date and time, identification information of a subject/talker, data converted into text, and the like are generated as the metadata. With respect to the group of documents, a date and time of use, a date and time of update, link information to a schedule of the user, and the like are generated as the metadata.

Next, in Step S155, the metadata generation unit 33 transfers the extracted metadata to the control unit 30.

Subsequently, in Step S158, the control unit 30 associates the content data with the metadata.

Next, in Step S161, the storage unit 34 stores the associated metadata.

<3-3. Start Process>

Figure 10:
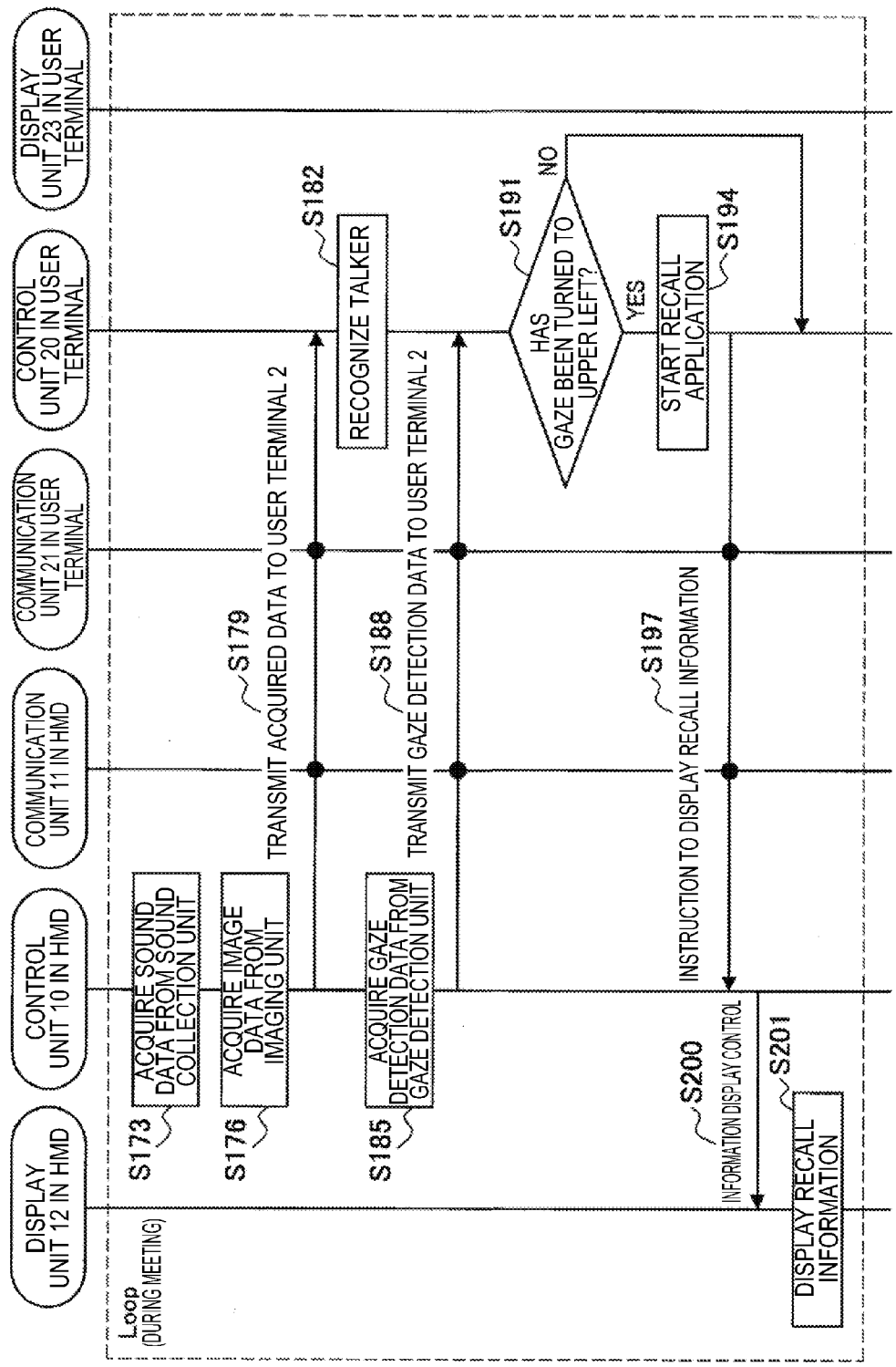
FIG. 10 is a sequence diagram illustrating a recall application start process according to the embodiment.

Next, with reference to FIG. 10, a start of a process of displaying past data relating to an interlocutor according to the embodiment (hereinafter, also referred to as a recall application) will be described. FIG. 10 is a sequence diagram illustrating a recall application start process according to the embodiment. Here, it is assumed that each attendee at a meeting wears the HMD 1 capable of using the system according to the embodiment. The attendees at the meeting include the user A and the user B.

In the system, the attendees at the meeting, the talker, and the like are automatically recognized on the basis of an analysis result of sound data and image data acquired by the sound collection unit 13 and the imaging unit 14 provided in each HMD 1. Thereby, for example, while the user B is speaking in front of the user A, the HMD 1a or the user terminal 2a of the user A clearly indicates that the person in front of the user A is the user B and the user B is a talker. Under such a situation, the user terminal 2 according to the embodiment starts the recall application by using a gaze motion of the user as a trigger.

Specifically, as illustrated in FIG. 10, the control unit 10 of the HMD 1 acquires sound data collected by the sound collection unit 13 in Step S173, and acquires image data captured by the imaging unit 14 in Step S176. The sound collection unit 13 collects sound of conversation in the meeting, and the imaging unit 14 captures images of the attendees at the meeting around the user.

Next, in Step S179, the control unit 10 carries out control to transmit the acquired data to the user terminal 2 via the communication unit 11.

Then, in Step S182, the control unit 20 of the user terminal 2 functions as the talker recognition unit 220 to recognize a talker in real time by analyzing data (sound data and image data) acquired from the HMD 1 via the communication unit 21. Accordingly, for example, it is possible to recognize the user B as an interlocutor for the user A. Note that, the Steps S173 to S182 may be repeated, and change in the talker can be recognized.

Next, in Step S185, the control unit 10 of the HMD 1 acquires gaze detection data of a wearer detected by the gaze detection unit 15.

In Step S188, the control unit 10 then carries out control to transmit the gaze detection data to the user terminal 2 via the communication unit 11.

Next, in Step S191, the control unit 20 of the user terminal 2 determines whether or not the gaze of the user has been turned to upper left on the basis of the gaze detection data received from the HMD 1 via the communication unit 21.

Subsequently, in the case where it has been determined that the gaze of the user has been turned to upper left (YES in Step S191), the control unit 20 starts the recall application in Step S194. As described above, in general, when a person recalls past memory, his/her gaze is turned to left. Therefore, as an example, the recall application is started by using the motion of the gaze of the user to the upper left as a trigger.

In Step S197, the control unit 20 then functions as the display control unit 240 to carry out control in a manner that the HMD 1 displays recall information (past data relating to interlocutor). The recall information is acquired from the cloud storage 3. A process of searching for the recall information will be described later.

Next, in Step S200, the control unit 10 of the HMD 1 carries out control in a manner that the display unit 12 displays the recall information in response to an instruction from the user terminal 2.

Next, in Step S201, the display unit 12 of the HMD 1 displays the recall information under the control of the control unit 10.

The recall application start process has been described. Next, with reference to FIG. 11, change in a field of view via the HMD 1 (display example) when the recall application starts will be described.

Figure 11:
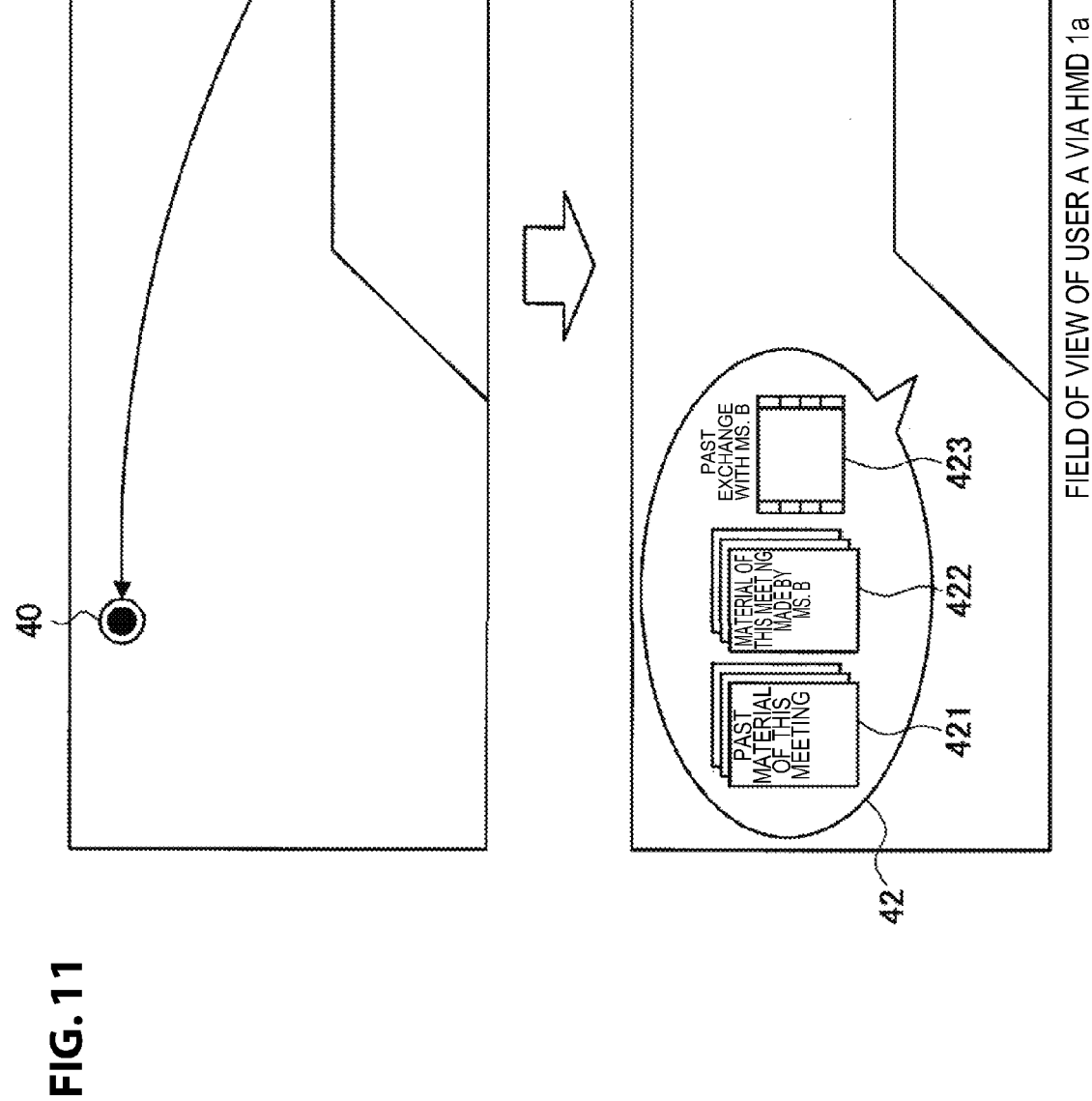
FIG. 11 is an explanatory diagram illustrating change in a field of view via an HMD when a recall application starts according to the embodiment.

In the example illustrated in FIG. 11, an image of scenery ahead captured by the imaging unit 14, that is, a field of view of the user wearing the HMD 1 at a time of staring the recall application is displayed, in the case where the display units 12 of the HMD 1 are not transparent as illustrated in FIG. 2. Alternatively, in the case of the translucent display units 12 such as a glasses-type see-through HMD, the user can see the scenery ahead in the real space via the translucent display units 12. As described above, the talker recognition is continuously carried out by this system during the meeting. Therefore, as illustrated in the top of FIG. 10, display indicating the talker is overlapped on the captured image of scenery ahead or the scenery of the real space in the display units 12 of the HMD 1.

After the gaze 40 of the user is naturally turned to the upper left when the user recalls past memory while carrying out discussion with an interlocutor user, the system continuously detecting the gaze starts the recall application. After the recall application has been started, the HMD 1 displays a speech balloon image 42 at the upper left of the field of view of the user under the control of the user terminal 2, for example. In the speech balloon image 42, groups 421 to 423 of materials of the past data relating to the interlocutor searched for in the cloud storage 3 are displayed. Thereby, since the data automatically searched for in the cloud storage 3 is displayed when the user has tried to recall the past memory, meaningful discussion can be carried out while the user checks the past data.

Although the gaze movement is used as the trigger, a recall application start trigger is not limited thereto. For example, clear start operation carried out by the user or the like may be used as the trigger. In addition, although the groups 421 to 423 of searched materials (recall information) of the past data automatically select the talker and relate to the talker, the embodiment is not limited thereto. For example, the materials may be the past data of another participant arbitrarily selected by user operation.

<3-4. Search Process>

Figure 12:
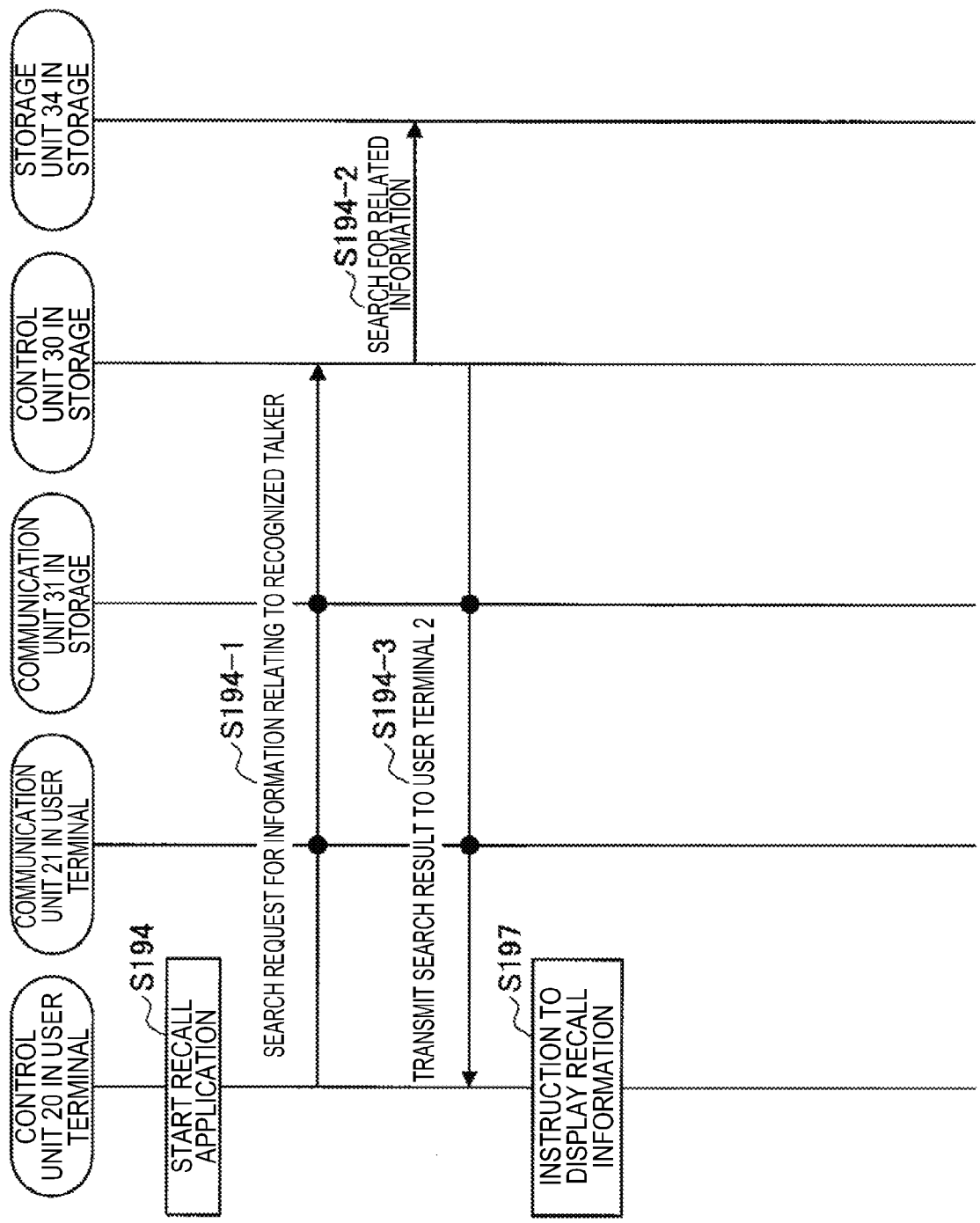
FIG. 12 is a sequence diagram illustrating a past data search process according to the embodiment.

Next, with reference to FIG. 12, a past data (recall information) search process according to the embodiment will be described. FIG. 12 is a sequence diagram illustrating the past data search process according to the embodiment.

In Step S194 in FIG. 12, the same process as Step S194 of the operation process illustrated in FIG. 10, that is, the recall application start process by the control unit 20 of the user terminal 2 is carried out. At this time, it is assumed that the talker has already been recognized in the above described Step S182.

Next, in Step S194-1, the control unit 20 functions as the search control unit 230 to issue a search request for information relating to the recognized talker (for example, user B) to the cloud storage 3 via the communication unit 21.

Then, in Step S194-2, the control unit 30 of the cloud storage 3 searches the storage unit 34 for the related information. At this time, for example, the control unit 30 searches for a past material of a plenary meeting that the user B is attending, all materials shared with others by the user B, a material used at a time when the user B and the user A have been talking, details of conversation with the user B, and the like, as the information relating to the user B who has been recognized as the talker. Specifically, the control unit 30 searches for such materials with reference to metadata of various content data stored in the storage unit 34. For example, since the lifelog is linked to recognition results of the talker and the surrounding people at that time as the metadata, sound data and image data acquired while being with the user B are extracted as the search result. In addition, details of e-mails exchanged by the user A and URL accessed by the user A before and after the time when being with the user B may be extracted as the search result. The time has been found out by the lifelogs.

Next, in Step S194-3, the control unit 30 transmits content data searched for in the storage unit 34, to the user terminal 2 as the search result via the communication unit 31.

Next, in Step S197, the control unit 20 of the user terminal 2 functions as the display control unit 240 to issue a recall information display instruction to the HMD 1 (see the same step in FIG. 10).

The search process according to the embodiment has been described. Note that, in the case where there are a plurality of search results as illustrated in FIG. 10, the groups 421 to 423 of materials of the past data are displayed in the speech balloon image 42. Accordingly, the user is capable of viewing a desired material after narrowing down any material. Next, with reference to FIGS. 13 and 14, the narrowing down of materials will be described. A narrowing-down operation may be carried out by a flick operation, tapping operation, or the like on the operation unit 22 (for example, touchscreen) of the user terminal 2 that the user has in his/her hands. In this case, the display unit 23 of the user terminal 2 also displays the speech balloon image 42 and the groups 421 to 423 of materials of the past data, and a narrowing-down operation in the user terminal 2 is reflected in the display unit 12 of the HMD 1.

Figure 13:
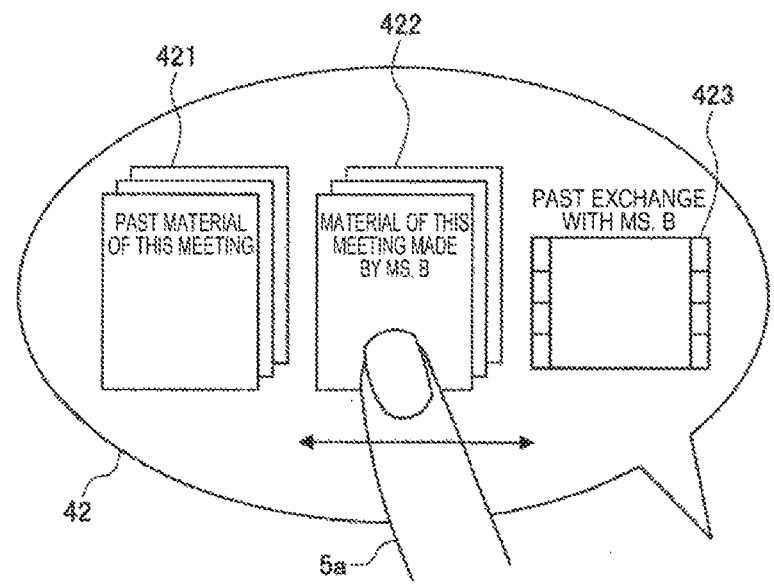
FIG. 13 is an explanatory diagram illustrating a case of viewing groups of materials by flick operation.

FIG. 13 is an explanatory diagram illustrating a case of viewing a group of materials by flick operation. In the case where a plurality of materials are displayed as past data in the speech balloon image 42 as illustrated in FIG. 13, the user A is capable of viewing another group of materials arranged in parallel by carrying out a right-and-left flick operation with a finger 5*a*. For example, in the example illustrated in FIG. 13, the groups 421 to 423 of materials of the past data are displayed in the speech balloon 42. However, in the case where another group of materials is additionally arranged, all groups are not displayed in the speech balloon image 42. Therefore, the user views the another group of material by the flick operation.

FIG. 14 is an explanatory diagram illustrating a case of viewing a content of one of materials. As illustrated in the top of FIG. 14, the group 422 of materials is tapped among the groups 421 to 423 of materials, and this enables display of details of the group 422 of materials. As illustrated in the middle of FIG. 14, when materials 422-1 to 422-3 are displayed as the details of the group 422 of materials, the user can then tap the desired material 422-2 to display a content of the materials 422-2.

Next, as illustrated in the bottom of FIG. 14, when the content of the material 422-2 are opened, the user can scroll and view the material 422-2 by flick operations from right to left or up and down.

The case where the material narrowing-down operation is carried out via the operation unit 22 of the user terminal 2 has been described. However, the embodiment is not limited thereto. For example, a gestural operation such as finger pointing may be carried out. An image of a gesture such as finger pointing is captured by the imaging unit 14 provided in the HMD 1, and is received as the gestural input by analyzing the captured image. In addition, at the time of inputting the gesture, a captured image of a hand or a finger may be overlapped and displayed on the display screen of the HMD 1.

<3-5. Keyword Search Process>

In the above described search process, the past data relating to the talker (or person arbitrarily designated by the user) is searched for, and the user carries out the narrowing-down operation. However, the embodiment is not limited thereto. Materials may be narrowed down by using a keyword extracted from conversation with the talker.

(3-5-1. Display of Keyword)

Figure 15:
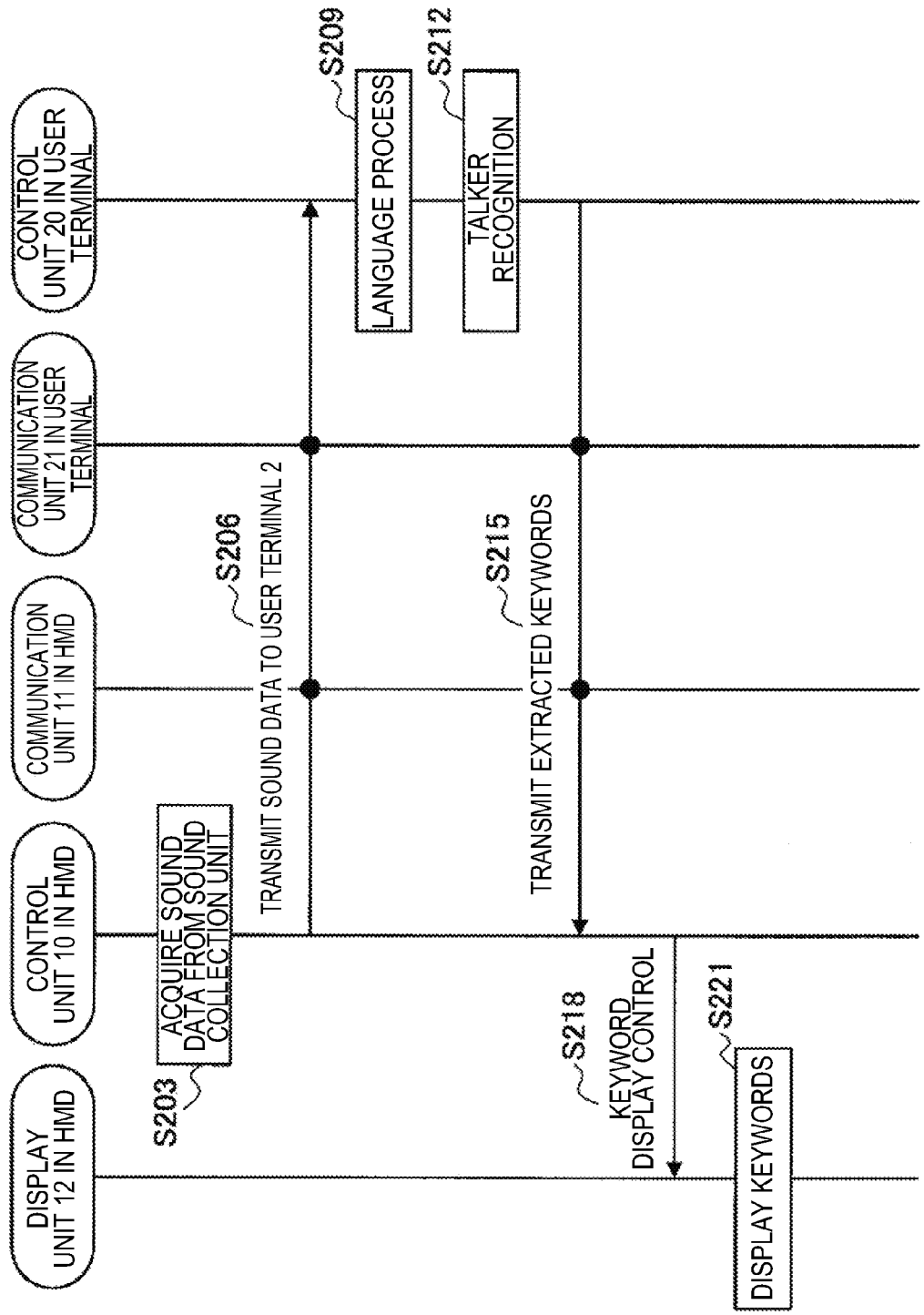
FIG. 15 is a sequence diagram illustrating a keyword display control process.

First, with reference to FIGS. 15 to 18, display of extracted keywords and narrowing down of materials will be described. FIG. 15 is a sequence diagram illustrating a keyword display control process.

As illustrated in FIG. 15, in Step S203, the control unit 10 of the HMD 1 acquires conversation with a talker (sound data) from the sound collection unit 13. Next, in Step S206, the control unit 10 transmits the sound data to the user terminal 2.

Then, in Step S209, the control unit 20 of the user terminal 2 functions as the language processing unit 260 to perform a language process on the sound data received from the HMD 1 via the communication unit 21, and extract keywords such as a noun and a demonstrative.

In Step 212, the control unit 20 functions as the talker recognition unit 220 to perform a talker recognition on the sound data received from the HMD 1 via the communication unit 21.

Next, in Step S215, the control unit 20 carries out control in a manner that the communication unit 21 transmits, to the HMD 1, the keywords extracted from the conversation with the talker.

In Step S218, the control unit 10 of the HMD 1 then carries out control in a manner that the display unit 12 displays the keywords transmitted from the user terminal 2 via the communication unit 11, in the vicinity of the corresponding talker.

Next, in Step S221, the display unit 12 of the HMD 1 carries out control in a manner that the keywords extracted from the conversation with the talker are displayed in the vicinity of the talker.

The above described keyword display control is continuously carried out in real time during the meeting. Next, with reference to FIG. 16, a keyword display example will be described. FIG. 16 is an explanatory diagram illustrating a keyword display example according to the embodiment. The example illustrated in FIG. 16 is fields of view of the user via the display unit 12 of the HMD 1. "MS. B, TALKER" is displayed in the vicinity of the user B who is a recognized talker. When the recall application is started, the speech balloon image 42 is displayed on the upper left side. Next, as illustrated in FIG. 16, a group 43 of keywords extracted from conversation with the user B is displayed by the above described keyword display control process. The keyword display control process is continuously carried out in real time during the meeting. As illustrated in FIG. 16, extracted keywords are sequentially displayed.

(3-5-2. Keyword Selection/Search Process)

Next, with reference to FIG. 17, a displayed keyword selection/search process will be described. As described with reference to FIG. 16, the user selects a keyword that the user wants to search for in the case where the group 43 of keywords is displayed. The selection operation may be carried out by the tapping operation or the like on the operation unit 22 of the user terminal 2, or may be the gestural input such as the finger pointing. In the sequence diagram illustrated in FIG. 17, the case where the selection is carried out by the tapping operation on the operation unit 22 of the user terminal 2 is described as an example.

Figure 17:
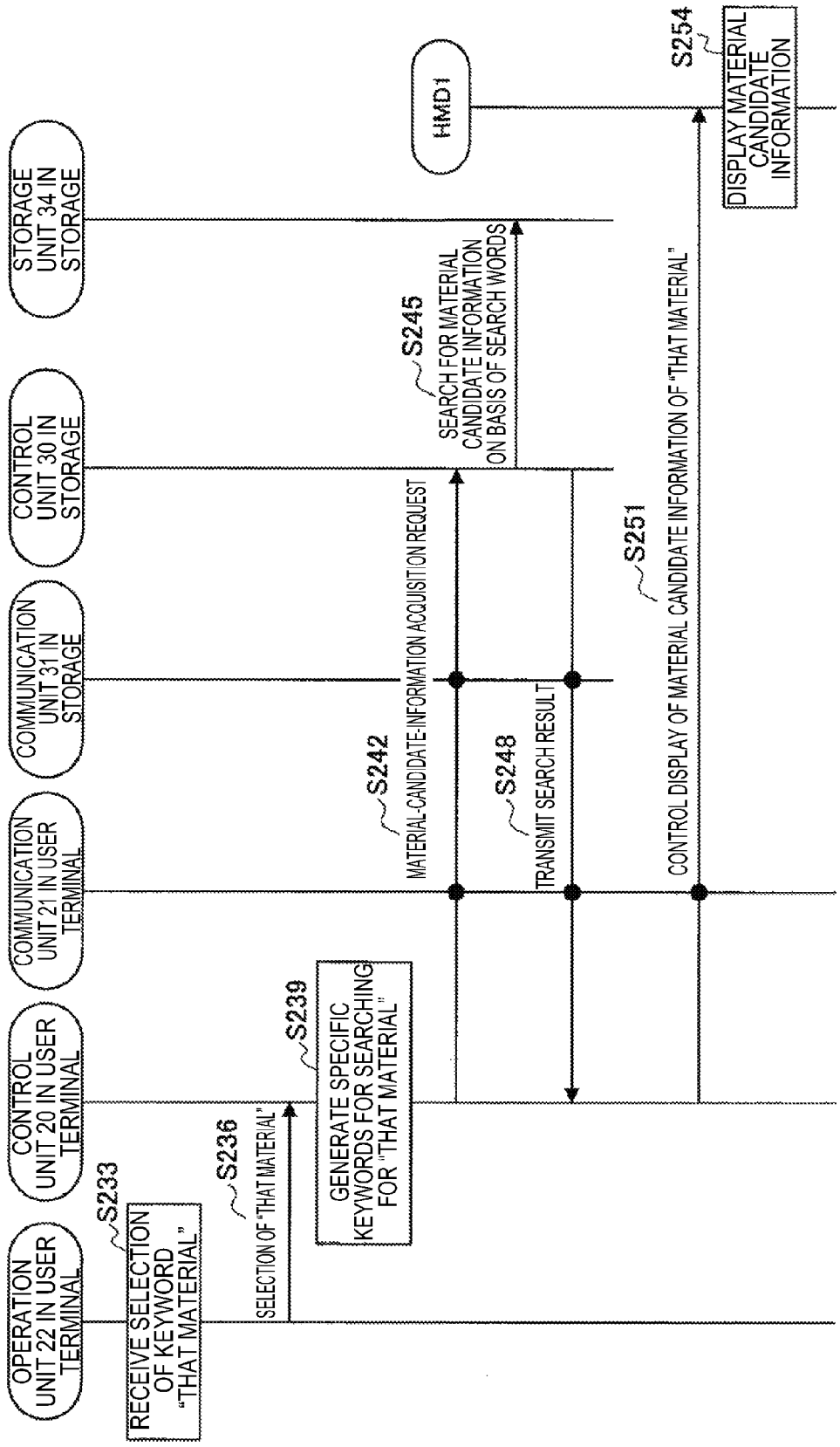
FIG. 17 is a sequence diagram illustrating a keyword selection/search process according to the embodiment.

FIG. 17 is a sequence diagram illustrating a keyword selection/search process according to the embodiment. As illustrated in FIG. 17, first, in Step S233, the operation unit 22 of the user terminal 2 receives selection of a keyword "that material".

Next, in Step S236, the operation unit 22 outputs detected details of the keyword selection (fact that keyword "that material" has been selected) to the control unit 20.

In Step S239, the control unit 20 then functions as the search control unit 230 to generate a specific search word to be used when the keyword "that material" is searched for. For example, from the keyword "that material", a material used by the talker in a past meeting that is the same kind of meeting as a current meeting, a material used when the talker has been talking with members attending the current meeting, and the like are estimated. Therefore, a title of the current meeting and names of all the members are generated as the specific search words.

Next, in Step S242, the control unit 20 issues a material-candidate-information acquisition request based on the generated search words to the cloud storage 3 via the communication unit 21.

Next, in Step S245, the control unit 30 of the cloud storage searches the storage unit 34 for material candidate information on the basis of the search words in response to the request from the user terminal 2. At this time, the control unit 30 searches for past materials and the like of predetermined meetings, with reference to metadata linked to the content data stored in the storage unit 34.

In Step S248, the control unit 30 then transmits a search result to the user terminal 2.

Next, in Step S251, the control unit 20 of the user terminal 2 transmits an instruction to the HMD 1 to display the material candidate information of "that material" on the basis of the search result.

Next, in Step S254, the control unit 10 of the HMD 1 carries out control in a manner that the display unit 12 displays the material candidate information in response to the instruction from the user terminal 2. At this time, the control unit 10 may carry out control in a manner that the material candidate information is displayed in the speech balloon image displayed along with the start of the recall application. Next, the following description is given with reference to FIG. 18.

FIG. 18 is a diagram illustrating an example of a keyword search result display screen. When the user selects "that material" in the case where the group 43 of keywords extracted during conversation with the user B is displayed as illustrated in the top of FIG. 18, a group 440 of material candidates (search result) estimated as "that material" is displayed in the speech balloon image 42 as illustrated in the bottom of FIG. 18. As described above, the narrowing-down search can be carried out in the embodiment on the basis of keywords extracted during conversation.

(3-5-3. Search Material Estimation Process)

In the above described search process, the target material is searched for by selecting one keyword from nouns or demonstratives extracted from the conversation. However, the embodiment is not limited thereto. It is also possible to carry out more accurate estimation of the target material on the basis of conversation before and after the conversation in which the selected keyword appears. Next, detailed description is provided with reference to FIGS. 19 to 22.

Figure 19:
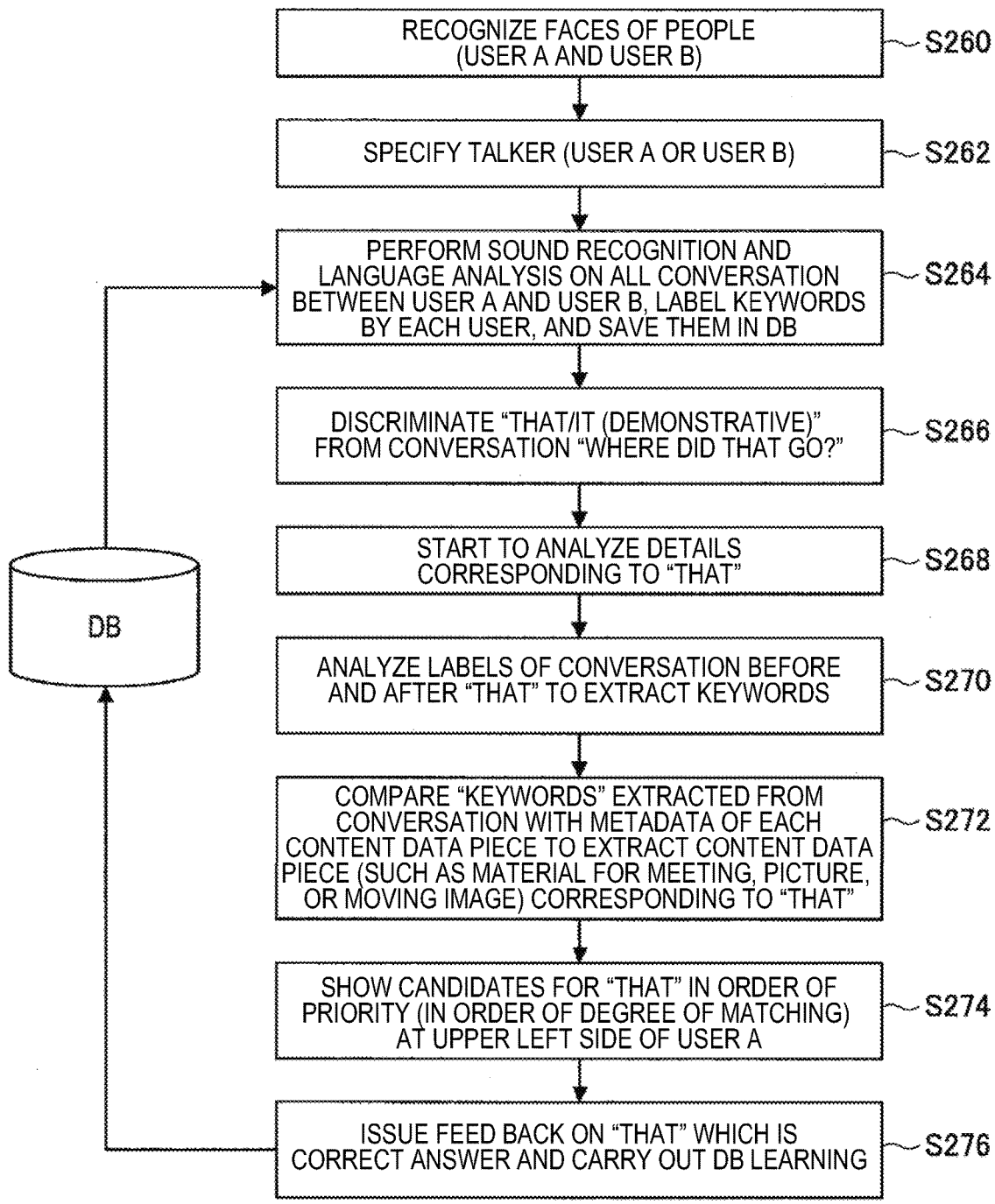
FIG. 19 is an explanatory diagram illustrating a target material estimation process.

FIG. 19 is an explanatory diagram illustrating a target material estimation process. The process illustrated in FIG. 19 is executed by the control unit 20 of the user terminal 2, for example. A "data base (DB)" in FIG. 19 corresponds to the storage unit 24 of the user terminal 2, for example.

First, in Step S260, the control unit 20 recognizes the face of a surrounding person on the basis of a captured image (for example, images captured in all directions from HMD 1) transmitted from the HMD 1. The attendees at the meeting include the user A and the user B. Note that, as an example, description is provided on the assumption that the process is carried out in the user terminal 2 held by the user A.

Next, in Step S262, the control unit 20 specifies a talker (here, user A or user B) on the basis of sound data and/or a captured image transmitted from the HMD 1.

In Step S264, the control unit 20 then performs sound recognition and language analysis on all conversation between the user A and the user B, labels keywords by each user, and saves them in the DB (storage unit 24). Note that, the labeling by the control unit 20 is not limited to labeling based on the sound recognition. For example, the labeling may be carried out on the basis of results of every kinds of recognition such as image (still image/moving image) recognition and behavior recognition. Next, the following table 1 shows an example of labeled keywords saved in the DB.

TABLE 1

| Person | Time | | |
|---|---|---|---|
| User A | After vacation | Product announcement | Tennis |
| User B | End of year | Press release | ... |

In Step S266, the control unit 20 then discriminates demonstratives such as "that/it" from conversation. For example, the control unit 20 discriminates a demonstrative "that" from conversation "where did that go?" of the user A.

Next, in Step S268, the control unit 20 starts to analyze details corresponding to the discriminated demonstrative.

Specifically, in Step S270, the control unit 20 analyzes labels of conversation before and after the discriminated demonstrative "that" to extract keywords. For example, from conversation with the user B that "'that' used at the last meeting with Ms. C at the end of the year is in the folder J", keywords such as "person: Mr. A, Ms. B, and Ms. C", "time: the end of the year", "location: meeting room", and "details of content: details of the meeting, conversation at lunch" are extracted.

In Step S272, the control unit 20 then compares the extracted "keywords" with metadata of each content data piece to extract a content data piece (such as material for meeting, picture, or moving image) corresponding to "that". The content data piece linked to the metadata is acquired from the cloud storage 3 and temporarily stored in the storage unit 24 of the user terminal 2. FIG. 20 illustrates an example of a list of candidates for "that" based on the comparison. As illustrated in FIG. 20, candidates 1 to 3 for "that" are provided by comparing the extracted keywords with metadata of each content data piece.

Next, in Step S274, the control unit 20 carries out control in a manner that the display unit 12 of the HMD 1 shows the candidates 1 to 3 for "that" in order of priority (in order of degree of matching) in the speech balloon image displayed at the upper left side viewed from the user A. Note that, in the case where selection operation is carried out in the user terminal 2, the display unit 23 of the user terminal 2 is also controlled to display the candidates 1 to 3 in a similar way.

Next, in Step S276, the user A select a proper material from the candidates 1 to 3 for "that" displayed on the display unit 12 of the HMD 1, and a correct answer is displayed. Alternatively, in the case where the candidates 1 to 3 are shown to the user B by a sharing setting (to be described later), sometimes the user B selects the proper material and the correct answer is displayed. When the proper material is selected, the control unit 20 of the user terminal 2 expands metadata of the candidate (content data piece) of "that" which is the correct answer by feedback learning. FIG. 21 is an explanatory diagram illustrating a case of expanding metadata by feedback learning. As illustrated in FIG. 21, for example, in the case where "fff.ppt" is the correct answer, keywords such as "time: end of year", "person: Ms. C", "others: folder J" are added as metadata to metadata of the content data piece.

In the above described estimation process, the candidate materials are estimated and shown on the basis of statements spoken by the user A or user B in the conversation. However, the embodiment is not limited thereto. For example, it is possible to show the candidate materials to a person who does not participate in the conversation. Next, the following description is given with reference to FIG. 22.

Figure 22:
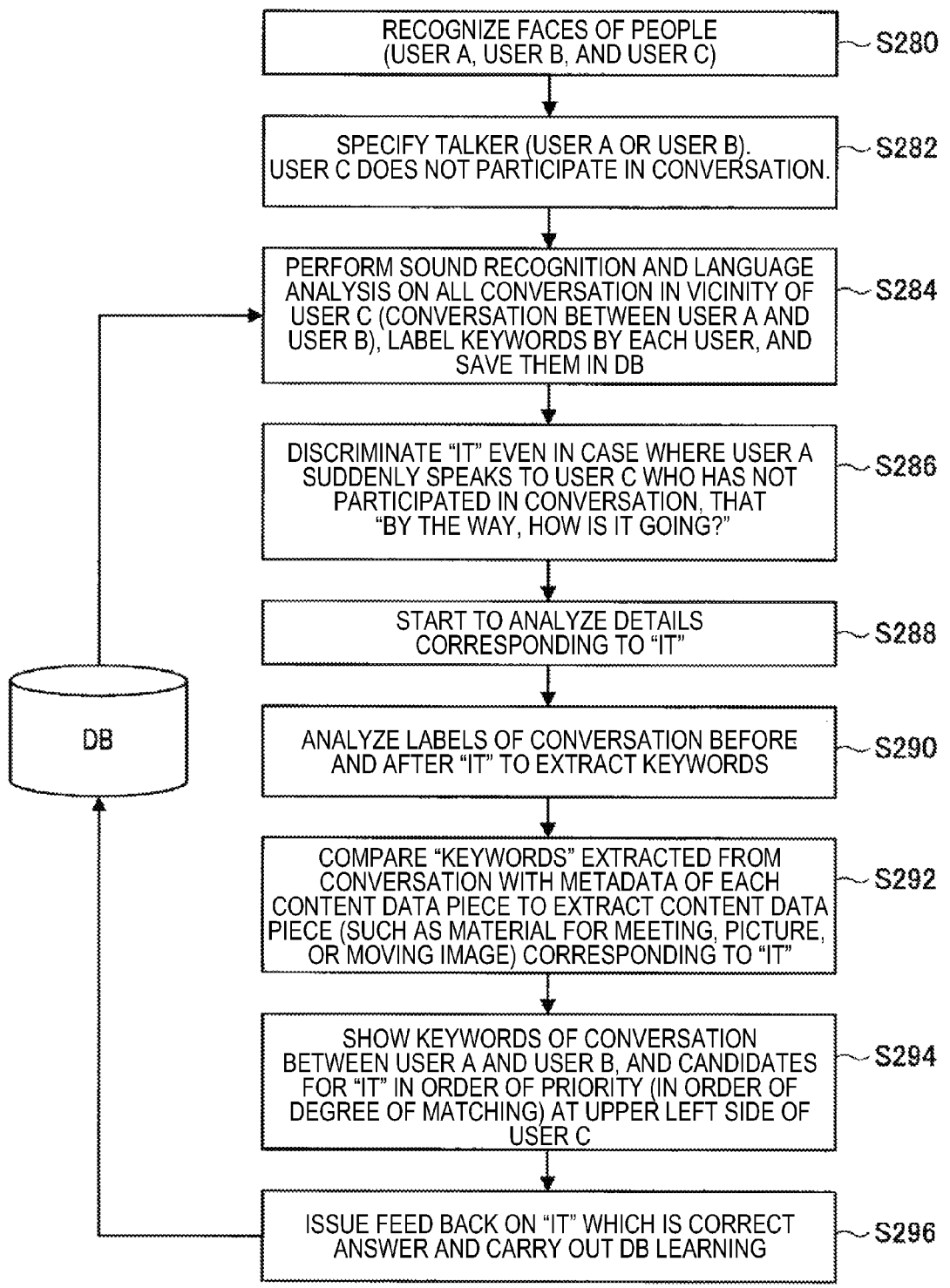
FIG. 22 is an explanatory diagram illustrating a process for showing candidate materials to a person who does not participate in conversation.

FIG. 22 is an explanatory diagram illustrating a process for showing candidate materials to a person who does not participate in conversation. First, in Step S280 illustrated in FIG. 22, the control unit 20 of the user terminal 2 recognizes the faces of surrounding people on the basis of a captured image (for example, images captured in all directions from HMD 1) transmitted from the HMD 1. The attendees at the meeting include the user A, the user B, and the user C. Note that, as an example, description is provided on the assumption that the process is carried out in the user terminal 2 held by the user C.

Next, in Step S282, the control unit 20 specifies a talker (here, user A or user B) on the basis of sound data and/or a captured image transmitted from the HMD 1. At this time, the user C does not participate in the conversation. The user C is out of the conversation.

In Step S284, the control unit 20 then performs sound recognition and language analysis on all conversation between the user A and the user B in the vicinity of the user C, labels keywords by each user, and saves them in the DB (storage unit 24).

Next, in Step S286, the control unit 20 discriminates a demonstrative "it" from conversation even in the case where the user A speaks to the user C who has not participated in the conversation, that "by the way, how is 'it' going?"

Next, in Step S288, the control unit 20 starts to analyze details corresponding to the discriminated demonstrative.

Specifically, in Step S290, the control unit 20 analyzes labels of conversation before and after the discriminated demonstrative "it" to extract keywords. As described above, since the control unit 20 in the user terminal 2 of the user C labels keywords by analyzing conversation spoken in the vicinity of the user C even when the user C does not participate in the conversation, it is possible to extract keywords also from the conversation before the user A speaks to the user C.

In Step S292, the control unit 20 then compares the extracted "keywords" with metadata of each content data piece to extract a content data piece (such as material for meeting, picture, or moving image) corresponding to "it".

Next, in Step S294, the control unit 20 carries out control in a manner that the display unit 12 of the HMD 1 shows the candidates for "it" in order of priority (in order of degree of matching) in the speech balloon image displayed at the upper left side viewed from the user C. At this time, it is also possible for the control unit 20 to additionally show keywords extracted from conversation between the user A and the user B.

Next, in Step S296, the user C selects a proper material from the candidates for "it" displayed on the display unit 12 of the HMD 1, and a correct answer is displayed. Alternatively, in the case where the candidates are shown to the users A and B by the sharing setting (to be described later), sometimes the user A or B selects the proper material and the correct answer is displayed. When the proper material is selected, the control unit 20 of the user terminal 2 expands metadata of the candidate (content data piece) of "it" which is the correct answer by feedback learning.

As described above, the user terminal 2 according to the embodiment analyzes the conversation around the terminal 2 even when its user does not participate in the conversation. Thereby, in the case where a demonstrative is extracted from conversation at a time when someone speaks to the user, it is possible to analyze previous conversation, estimate candidate materials on the basis of labeled keywords, and show the candidate materials to the user.

<3-6. Sharing Process>

Next, the case where past data (candidate materials) shown to the user is shared with another user by staring the recall application will be described with reference to FIGS. 23 to 25. Note that, as an example, it is assumed that the user A shares past data with the user B.

Figure 23:
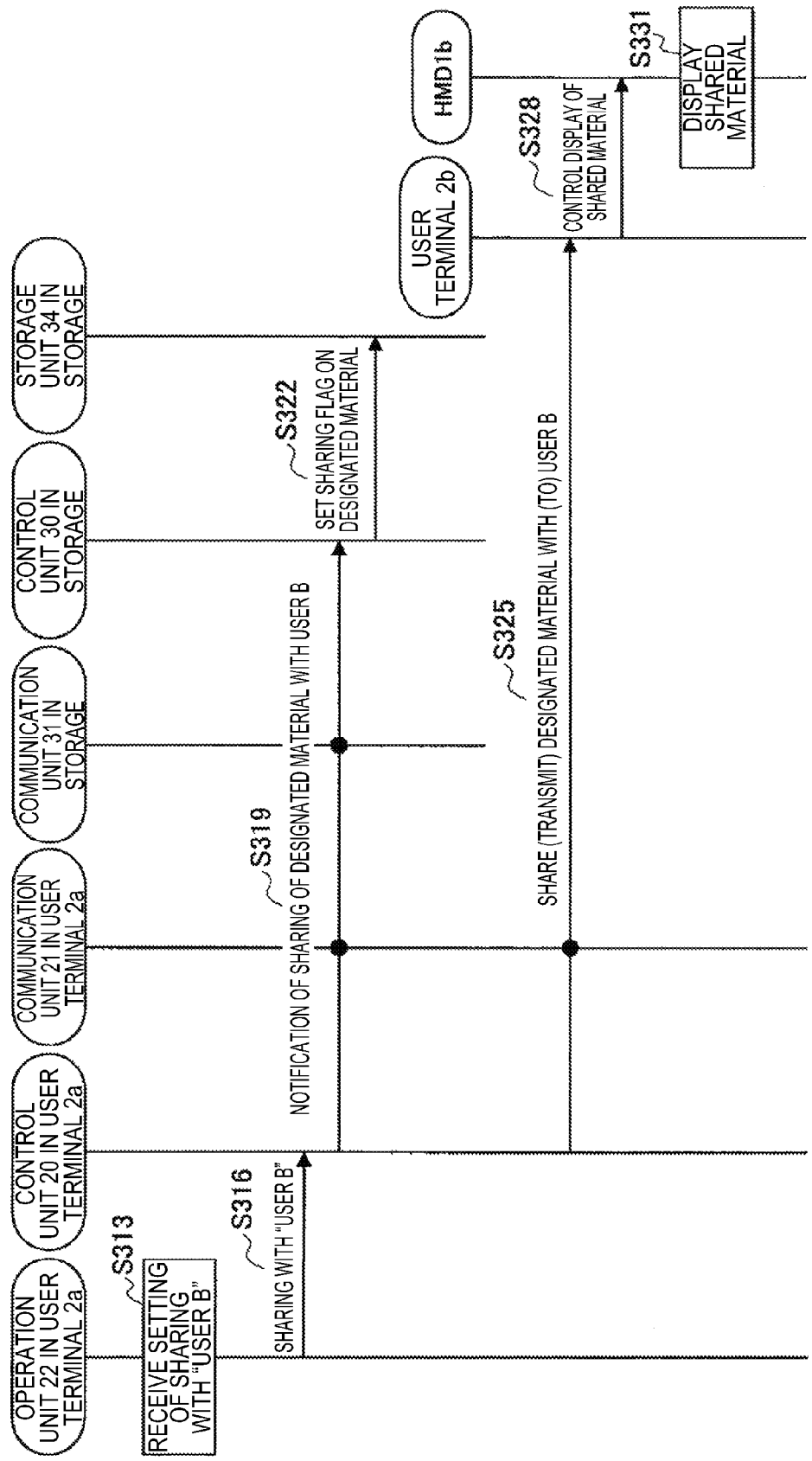
FIG. 23 is a sequence diagram illustrating a sharing process according to the embodiment.
Figure 24:
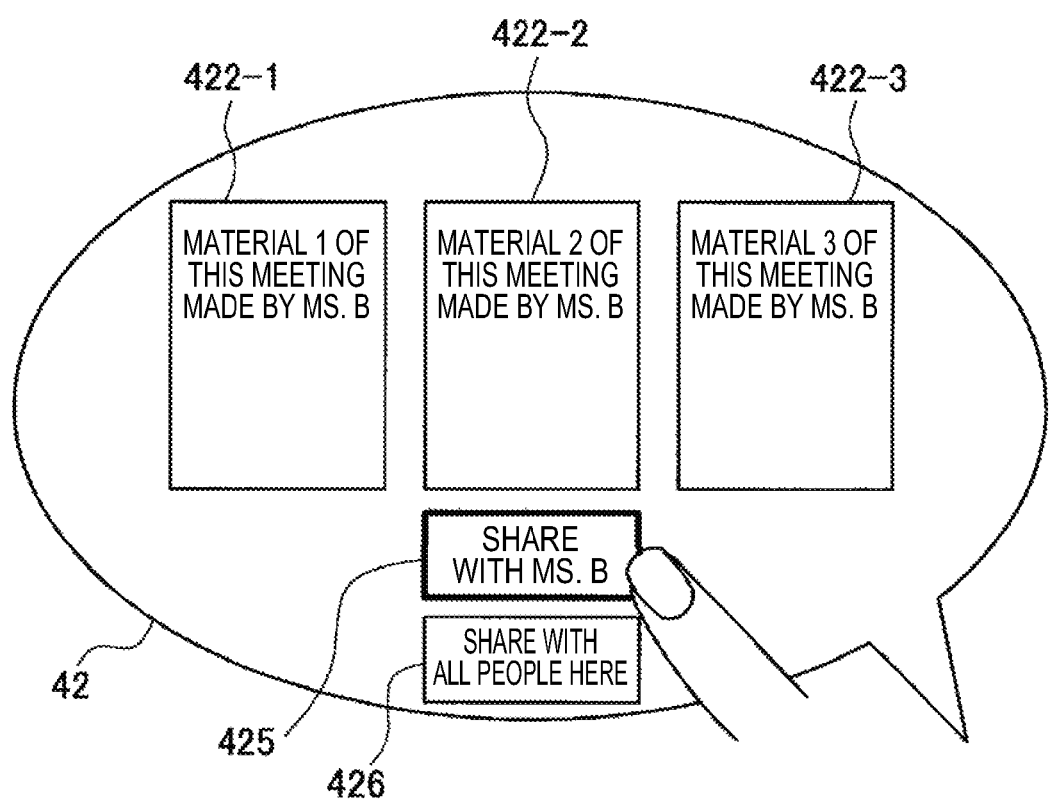
FIG. 24 is an explanatory diagram illustrating sharing setting operation.

FIG. 23 is a sequence diagram illustrating a sharing process according to the embodiment. As illustrated in FIG. 23, first, in Step S313, the operation unit 22 of the user terminal 2a held by the user A receives a setting of sharing past data with the user B. For example, as illustrated in FIG. 24, operation of the sharing setting is carried out by selecting a sharing setting button 425 or 426 displayed corresponding to past data to be shared. The sharing setting button 425 is selected in the case of sharing with the user B alone who is an interlocutor. The sharing setting button 426 is selected in the case of sharing with all companies.

Next, in Step S316, The operation unit 22 of the user terminal 2a outputs, to the control unit 20, detection of operation of the setting of sharing with the user B.

In Step S319, the control unit 20 then notifies the cloud storage 3 of sharing of a designated material ("material 2 of this meeting made by Ms. B" in the example illustrated in FIG. 24) with the user B.

Next, in Step S322, the control unit 30 of the cloud storage 3 carries out control in a manner that a sharing flag is set on the designated material stored in an area in the storage unit 34 whose access authority has been granted to the user A.

In Step S325, the control unit 20 of the user terminal 2a transmits the designated material to the user terminal 2b held by the user B for which the sharing setting is configured.

Next, in Step S328, the user terminal 2b instruct the HMD 1b worn by the user B to display the shared material transmitted from the user terminal 2a.

Next, in Step S331, the HMD 1b displays the material shared from the user A at a position corresponding to the user A (for example, above the head of the user A) in the display screen in response to the instruction from the user terminal 2b. FIG. 25 illustrates an example of a screen for showing the material shared from a user A to a user B. FIG. 25 illustrates a field of view of the user B wearing the HMD 1b (display screen of display unit 12).

Figure 25:
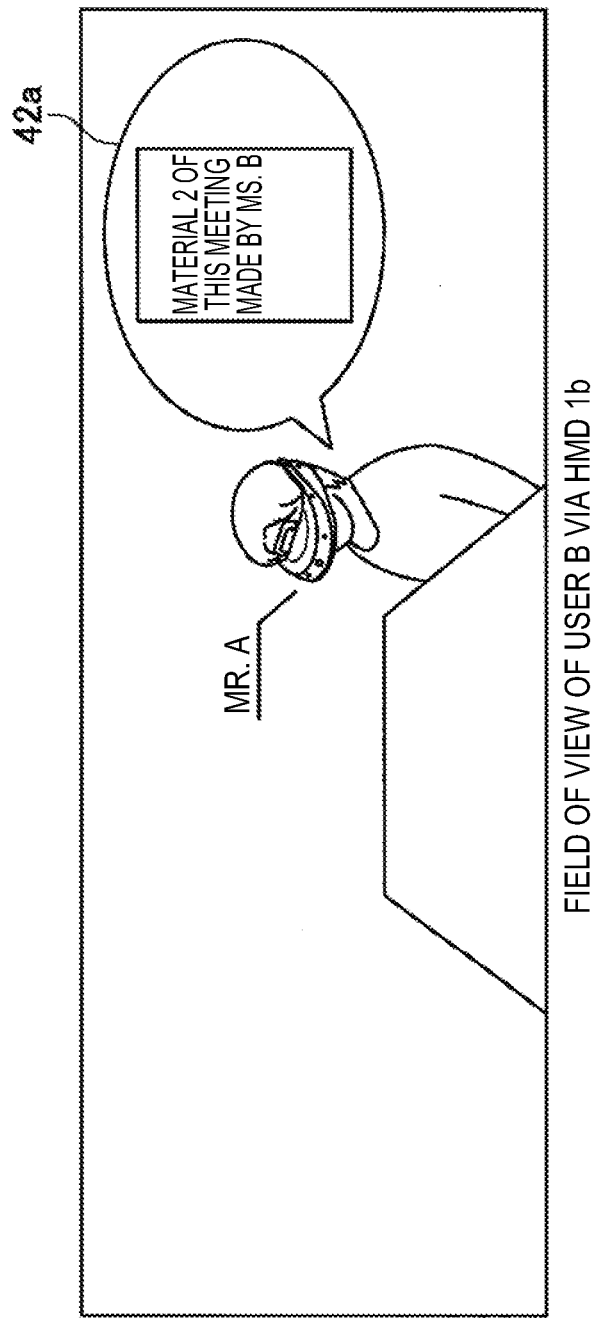
FIG. 25 is a diagram illustrating an example of a screen for showing a material ¥ shared from a user A to a user B.

As illustrated in FIG. 25, the material shared from a user A to a user B is shown in a speech balloon image 42a displayed above the head of the user A. Thereby, the user B can intuitively recognize the past data that the user A is now recalling. The user B can open the past data and view a content of the past data in the speech balloon image 42a above the head of the user, or the user B can copy the past data to the storage area of the user B. The copying of the shared material will be described later.

As described above, according to the embodiment, it is possible to share past data recalled by a user with another user. Thereby, meaningful discussion can be carried out. In the sharing process described with reference to FIG. 23, the user terminal 2a transmits the shared material (content data) to the user terminal 2b. However, the embodiment is not limited thereto. For example, in the case where a sharing flag is set in the storage unit 34 of the cloud storage 3, the control unit 30 of the cloud storage 3 may transmit a shared material to the user terminal 2b of the user B for which the sharing setting has been configured.

<3-7. Shared Material Copying Process>

Next, with reference to FIG. 26 to FIG. 28, a shared material copying process will be described. Here, as an example, copying of a material (past data) shared from the user A to the user B is described. The copying operation may be carried out by the drag-drop operation or the like on the operation unit 22 of the user terminal 2, or may be the gestural input such as the finger pointing.

Figure 26:
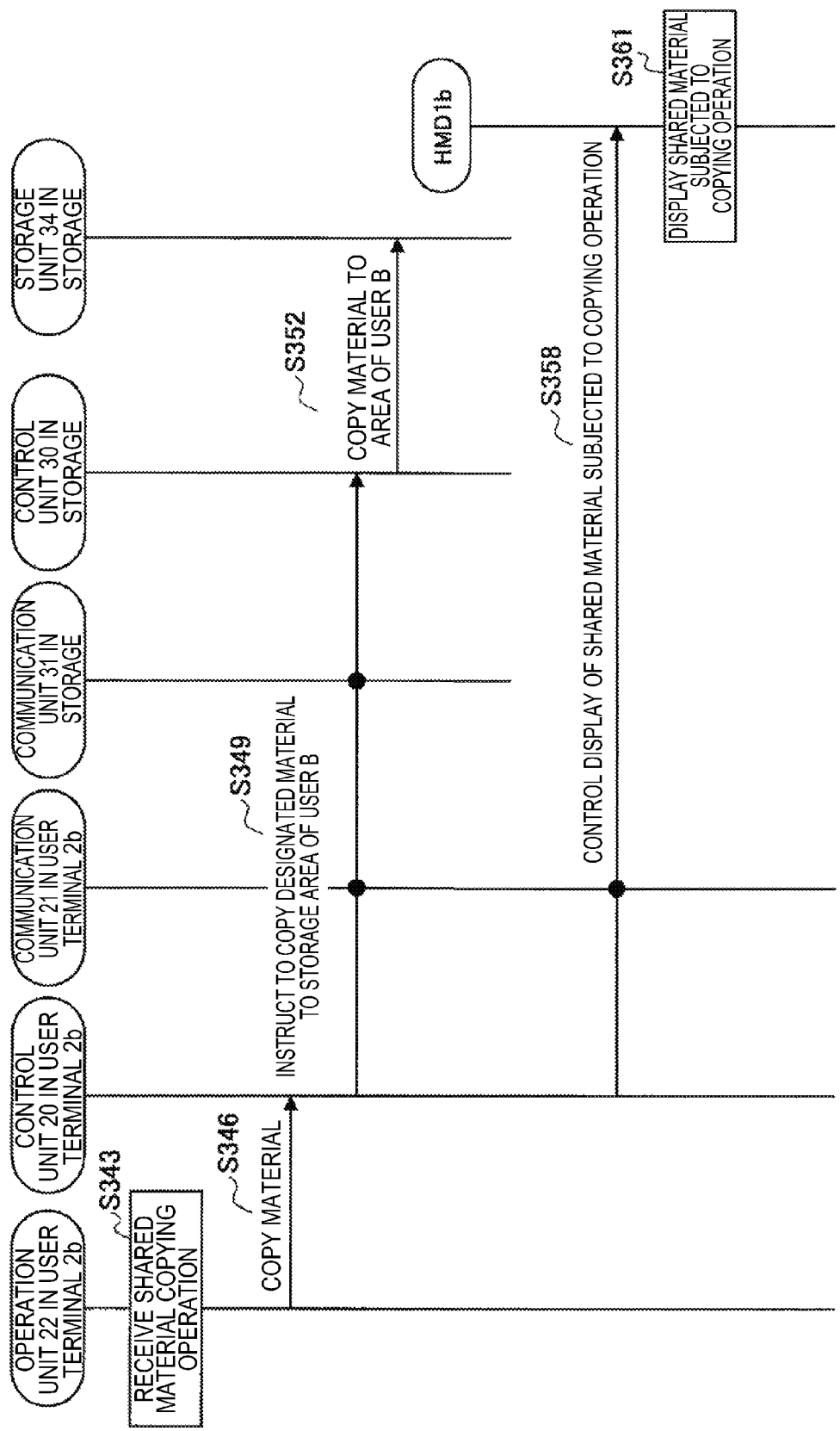
FIG. 26 is a sequence diagram illustrating a shared material copy process according to the embodiment.

FIG. 26 is a sequence diagram illustrating a shared material copying process according to the embodiment. The sequence diagram in FIG. 26 illustrates the case of operation on the operation unit 22 of the user terminal 2b, as an example.

As illustrated in FIG. 26, first, in Step S343, the operation unit 22 of the user terminal 2b receives a shared material copying operation.

Next, in Step S346, the operation unit 22 outputs detection of copying operation to the control unit 20.

In Step S349, the control unit 20 then instructs the cloud storage 3 to copy a designated material to a storage area accessible for the user B.

Next, in Step S352, the control unit 30 of the cloud storage 3 copies, to the area accessible for the user B, a shared material which is stored in an area of the storage unit 34 accessible for the user A and on which a sharing flag is set.

In Step S358, the control unit 20 of the user terminal 2b carries out control in a manner that the shared material subjected to the copying operation is displayed in the speech balloon image of the user B in the display screen of the HMD 1.

Next, in Step S361, the HMD 1b displays the shared material subjected to the copying operation in the speech balloon image displayed at the upper left side viewed from the user B. This enables the user to intuitively recognize that the shared material has been copied.

Figure 27:
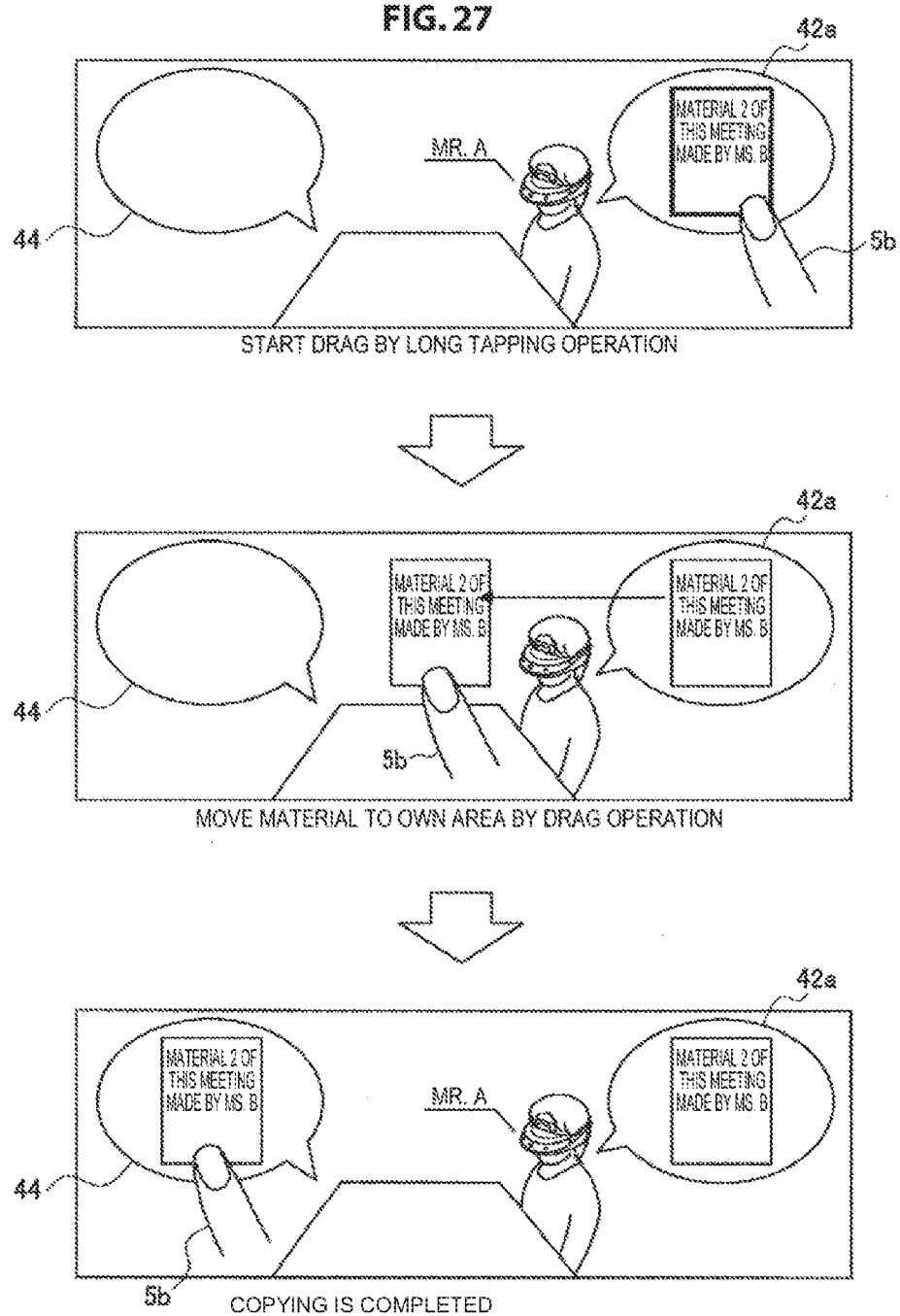
FIG. 27 is an explanatory diagram illustrating shared material copy operation.

For example, as illustrated in FIG. 27, the shared material copying operation can also be carried out by the drag-drop operation. FIG. 27 is an explanatory diagram illustrating a shared material copying operation.

As illustrated in the top of FIG. 27, long tapping of a shared material with a finger 5b in the speech balloon image 42a displayed above the head of the user A enables to start drag. The user moves the shared material subjected to the long tapping to an area of an own speech balloon image 44 displayed at the upper left side, and drops the shared material in the speech balloon image 44. Thereby, the shared material copying operation is completed, and the shared material is copied to the storage area accessible for the user B in the storage unit 34 of the cloud storage 3.

Next, with reference to FIG. 28, viewing of the copied shared material will be described. When the user B taps the shared material copied to the speech balloon image 44 as illustrated in the top of FIG. 28, a content of the shared material is opened and overlapped on the entire screen as illustrated in the bottom of FIG. 28. The user can scroll and view the content of the shared material by the flick operation or the like.

Figure 28:
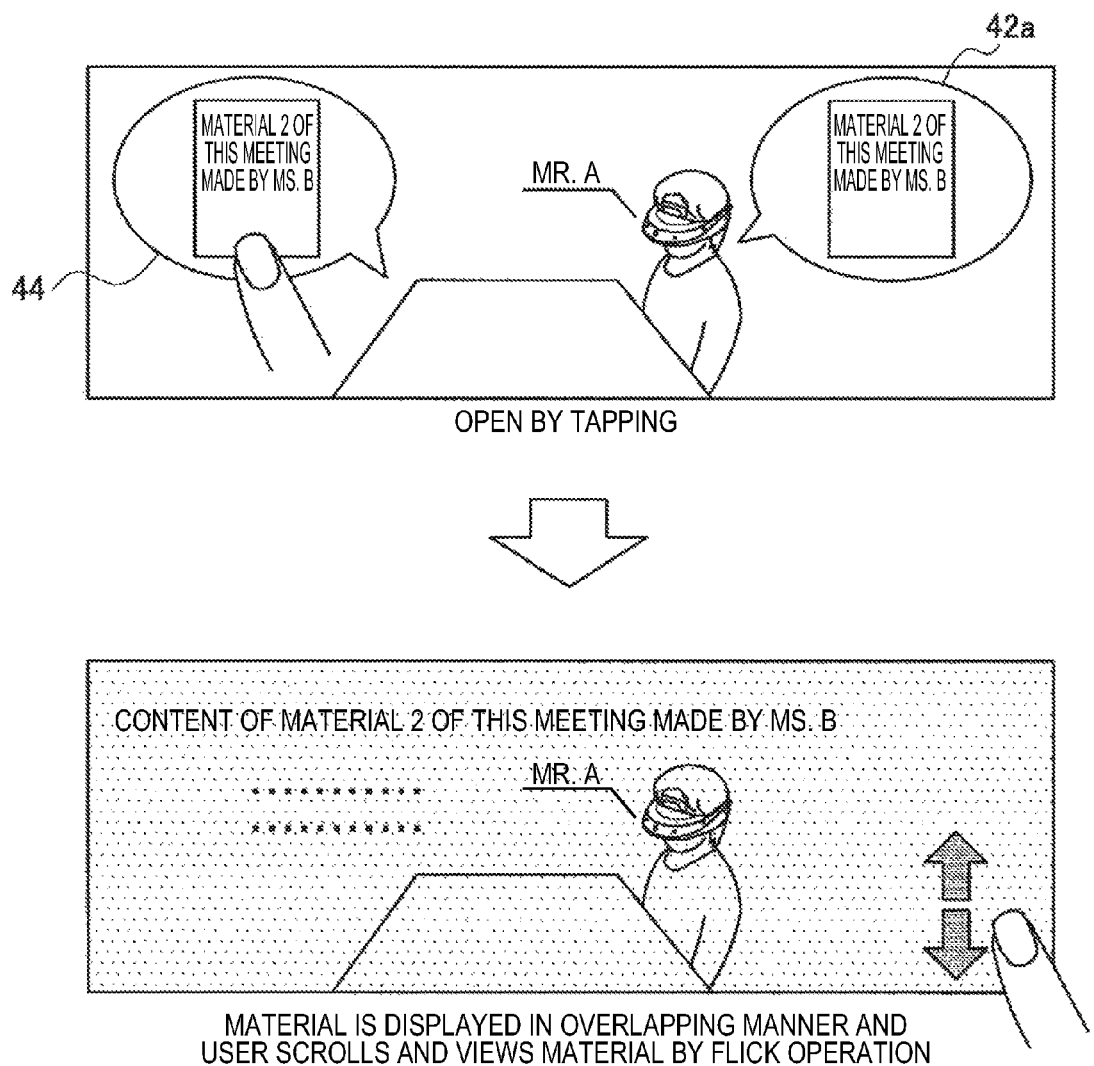
FIG. 28 is an explanatory diagram illustrating viewing of a shared material.

In the example illustrated in FIG. 28, the display unit 23 of the user terminal 2 displays a screen similar to the display unit 12 of the HMD 1. Change in the screen in response to a tapping operation or a flick operation received from the operation unit 22 is reflected in the display unit 12 of the HMD 1. However, the embodiment is not limited to the operation input to the operation unit 22 of the user terminal 2. The gestural input such as the finger pointing may also be possible.

<<4. Conclusion>>

As described above, in the information sharing system according to the embodiment of the present disclosure, past data relating to an interlocutor can be visually shared with the interlocutor. Thereby, meaningful discussion can be carried out. In addition, for example, in the information sharing system according to the embodiment, the past data relating to the interlocutor is automatically shown on the basis of gaze detection, by using past memory recalling movement carried out by the user (movement of gaze position to upper left side) as a trigger. Accordingly, convenience of this system can be improved.

In addition, in the information sharing system according to the embodiment, it is possible to more accurately show past data desired by a user by estimating a candidate material (past data) on the basis of details of conversation with an interlocutor.

Hereinabove, although the preferred embodiments of the present disclosure have been described in detail with reference to the accompanying drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, it is also possible to create a computer program for causing a hardware such as CPU, ROM, and RAM, which are embedded in the above described HMD 1, user terminal 2, or cloud storage 3, to execute the functions of the HMD 1, user terminal 2, or cloud storage 3. Moreover, it may be possible to provide a computer-readable storage medium having the computer program stored therein.

As an example, in the above described embodiment, information relating to the user B who is the interlocutor is shown by using movement of the gaze of the person wearing the HMD 1a to the upper left side as a trigger. However, the embodiment is not limited thereto. In other words, since there is an interindividual variability in a gaze moving direction when someone recalls past memory, predetermined information may be shown also when the eyes have moved to the lower left side, upper right side, lower right side, or the like.

The above described embodiment describes the example in which eyes move to the left when his/her right brain is used. On the other hand, the left brain is responsible for logic, fact, and language. The left brain that is brain for logic is used when "fiction", "image" or "lie" is created, so as not to include collapse or conflict in the story, and the eyes move to the right opposite to the left. Therefore, it is also possible in the embodiment to show an automatically created fictional story by using movement of eyes of a wearer of the HMD 1a to the upper right side as a trigger.

For example, when the eyes of the user A moves to the upper right side while the user A wearing the HMD 1a is talking with the user B, information relating to the user B who is an interlocutor is extracted, and information obtained by changing a part of the extracted information (fiction) is shown to the user A. Specifically, for example, in the case where information relating to dinner with the user A and the user C involved in conversation is extracted as information relating to the user B who is the interlocutor, the display unit 12 of the HMD 1 displays the information after changing the dinner into a lunch meeting with the user C, user A and user D. As described above, in the embodiment, past data is shown as it is in the case where the eyes of the wearer moves to the upper left side, and modified information obtained by changing a part of the past data is shown in the case where the eyes moves to the upper right side. Thereby, it is possible to show information that suits the need of the wearer, and the convenience can be improved more. Note that, since there is an interindividual variability in an eye moving direction when someone creates fiction or lies, predetermined information may be shown also when the eyes move to the lower right side, upper left side, lower left side, or the like.

The information sharing system according to the embodiment may be achieved without the user terminal 2. In this case, the control unit 10 of the HMD 1 or the control unit 30 of the cloud storage 3 executes functions of the control unit 20 of the user terminal 2 illustrated in FIG. 4.

In addition, an area to which content data such as lifelogs are accumulated is not limited to the cloud storage 3. For example, the content data may be accumulated in a local storage such as the user terminal 2 or an individual personal computer (PC) of a user.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:
  a display control unit configured to carry out control in a manner that a display unit disposed before eyes of a user displays past data relating to a recognized interlocutor; and
  a sharing setting control unit configured to carry out control in a manner that sharing of the past data with another person is set.

(2)
The information processing device according to (1), further including
a search control unit configured to carry out control to search for the past data relating to the interlocutor on the basis of metadata associated with past data stored in a storage unit.

(3)
The information processing device according to (2), wherein the search control unit searches for past data with reference to a current date and time, a current location, or current schedule information of a user.

(4)
The information processing device according to (2) or (3), wherein the search control unit searches for past data relating to a keyword extracted from conversation.

(5)
The information processing device according to (4), wherein the search control unit searches for a candidate material of a demonstrative extracted from conversation as past data by comparing a keyword before or after the demonstrative with metadata associated with the past data.

(6)
The information processing device according to any one of (1) to (5),
wherein the display control unit carries out control in a manner that the past data is displayed when a detected gaze position of a user has moved to a predetermined area and recall movement has been carried out.

(7)
The information processing device according to any one of (1) to (6),
wherein the display control unit carries out control to display past data for which an interlocutor has configured a sharing setting.

(8)
The information processing device according to (7),
wherein the display control unit carries out control in a manner that the past data is displayed at a position corresponding to an interlocutor who has configured a sharing setting.

(9)
A control method including:
carrying out control in a manner that a display unit disposed before eyes of a user displays past data relating to a recognized interlocutor; and
carrying out control in a manner that sharing of the past data with another person is set.

(10)
A program for causing a computer to function as:
a display control unit configured to carry out control in a manner that a display unit disposed before eyes of a user displays past data relating to a recognized interlocutor; and
a sharing setting control unit configured to carry out control in a manner that sharing of the past data with another person is set.

(11)
A system including:
a server configured to store past data of each user;
a wearable device configured to be mounted on a head of a user and to have a display unit disposed before eyes of the user; and
a user terminal including
a display control unit configured to carry out control in a manner that the display unit displays past data acquired from the server, the past data relating to a recognized interlocutor, and
a sharing setting control unit configured to carry out control in a manner that sharing of the past data with another person is set.

REFERENCE SIGNS LIST 1, 1a, 1b HMD
101 main body
102 forehead pad
103 nose pad
104 upper band
105 lower band
110 headphone
10 control unit
11 communication unit
12 display unit
13 sound collection unit
14 imaging unit
14a to 14d imaging lens
15 gaze detection unit
16 storage unit
130 microphone (microphone array)
2, 2a, 2b user terminal
20 control unit
210 lifelog acquisition control unit
220 talker recognition unit
230 search control unit
240 display control unit
250 sharing setting control unit
260 language processing unit
21 communication unit
22 operation unit
23 display unit
24 storage unit
3 cloud storage
30 control unit
31 communication unit
33 metadata generation unit
34 storage unit
40 gaze
42 speech balloon image
421 to 423 group of materials
5a, 5b finger
425, 426 sharing setting button

The invention claimed is:
1. An information processing device, comprising:
a display control unit configured to control a display unit to display past data-associated with at least one of a first user or a second user, wherein the display unit is placed before eyes of the first user;
a lifelog acquisition control unit configured to receive an image and sound data;
a talker recognition unit configured to:
analyze the sound data;
determine a direction of a sound source based on the analysis of the sound data;
separate the sound data into environmental sound, sound of speech of the first user, and sound of speech of the second user; and
recognize the second user from the image based on the direction of the sound source;
a sharing setting control unit configured to control a sharing operation of the past data with the recognized second user to initiate a communication between the first user and the recognized second user; and a search control unit configured to search for the past data based on metadata associated with the past data.

2. The information processing device according to claim 1, wherein the search control unit is further configured to search for the past data based on at least one of a current date and time, current schedule information of the first user, or current location information of the first user.

3. The information processing device according to claim 1, wherein the search control unit is further configured to search for the past data based on a keyword extracted from a conversation between the first user and the second user.

4. The information processing device according to claim 3, wherein the search control unit is further configured to search for candidate information of a demonstrative extracted from the conversation as the past data, wherein the search for the candidate information is based on comparison of keywords before and after the demonstrative with the metadata associated with the past data.

5. The information processing device according to claim 1, wherein the display control unit is further configured to control the display unit to display the past data based on a detection of a movement of a gaze position of the first user to a determined area in a field of view of the first user.

6. The information processing device according to claim 1, wherein the display control unit is further configured to control the display unit to display the past data based on a sharing setting associated with the recognized second user.

7. The information processing device according to claim 6, wherein the display control unit is further configured to control the display unit to display the past data at a position on the display unit, the position corresponding to the recognized second user.

8. A control method, comprising:
in a device associated with a first user:
receiving, by at least one processor, an image and sound data;
analyzing, by the at least one processor, the sound data;
determining, by the at least one processor, a direction of a sound source based on the analysis of the sound data;
separating, by the at least one processor, the sound data into environmental sound, sound of speech of the first user, and sound of speech of a second user;
recognizing, by the at least one processor, the second user from the image based on the direction of the sound source;
searching, by the at least one processor, for past data associated with at least one of the first user or the recognized second user based on metadata associated with the past data;
controlling, by at least one processor, a display unit to display the past data, wherein the display unit is placed before eyes of the first user; and
controlling, by the at least one processor, a sharing operation of the past data with the recognized second user to initiate a communication between the first user and the recognized second user.

9. A non-transitory computer-readable medium having stored thereon computer-readable instructions, which when executed by at least one processor in a device associated with a first user, cause the at least one processor to execute operations, the operations comprising:
receiving an image and sound data;
analyzing the sound data;
determining a direction of a sound source based on the analysis of the sound data;
separating the sound data into environmental sound, sound of speech of the first user, and sound of speech of a second user;
recognizing the second user from the image based on the direction of the sound source;
searching for past data associated with at least one of the first user or the recognized second user based on metadata associated with the past data;
controlling a display unit to display past data, wherein the display unit is placed before eyes of the first user; and
controlling a sharing operation of the past data with the recognized second user to initiate a communication between the first user and the recognized second user.

10. A system, comprising:
a server configured to store past data associated with at least one of a first user or a second user;
a wearable device mountable on a head of the first user, wherein the wearable device comprises a display unit placed before eyes of the first user; and
a user terminal that comprises:
a display control unit configured to control the display unit to display the past data acquired from the server;
a lifelog acquisition control unit configured to receive an image and sound data from the wearable device;
a talker recognition unit configured to:
analyze the sound data;
determine a direction of a sound source based on the analysis of the sound data;
separate the sound data into environmental sound, sound of speech of the first user, and sound of speech of the second user; and
recognize the second user from the image based on the direction of the sound source;
a sharing setting control unit configured to control a sharing operation of the past data with the recognized second user to initiate a communication between the first user and the recognized second user; and
a search control unit configured to search for the past data based on metadata associated with the past data.

* * * * *